(12) United States Patent
Hakeem et al.

(10) Patent No.: US 11,492,257 B1
(45) Date of Patent: Nov. 8, 2022

(54) METHOD OF FORMING AN ALKALI METAL-DOPED CALCIUM-SIA1ON MATERIAL

(71) Applicant: KING FAHD UNIVERSITY OF PETROLEUM AND MINERALS, Dhahran (SA)

(72) Inventors: Abbas Saeed Hakeem, Dhahran (SA); Qasem Ahmed Qasem Drmosh, Dhahran (SA); Natalia Anna Wójcik, Dhahran (SA); Sharafat Ali, Dhahran (SA); Amar Kamal Mohamedkhair, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 17/741,858

(22) Filed: May 11, 2022

(51) Int. Cl.
C01B 21/082 (2006.01)

(52) U.S. Cl.
CPC ...... C01B 21/0826 (2013.01); *C01P 2002/02* (2013.01); *C01P 2002/54* (2013.01); *C01P 2002/72* (2013.01); *C01P 2006/40* (2013.01)

(58) Field of Classification Search
CPC ................................................ C01B 21/0826
See application file for complete search history.

(56) References Cited

U.S. PATENT DOCUMENTS

| 7,074,346 B2 | 7/2006 | Yamada et al. |
| 7,910,023 B2 | 3/2011 | Xie et al. |
| 10,125,313 B2 | 11/2018 | Sumino et al. |
| 2004/0222572 A1 | 11/2004 | White |

FOREIGN PATENT DOCUMENTS

| CN | 101851098 A | 10/2010 |
| JP | 4292255 B2 | 7/2009 |

OTHER PUBLICATIONS

H. Peng, et al., "Fabrication of Li-Doped Sialon Ceramics by Spark Plasma Sintering", Key Engineering Materials, vols. 264-268, 2004, pp. 885-888.
Hui-Li Li, et al., "Optical properties of green-blue-emitting Ca-α-Sialon:$Ce^{3+}$,$Li^+$ phosphors for white light-emitting diodes (LEDs)", Journal of Solid State Chemistry, vol. 184, Issue 5, 2011, 42/ 38, pp. 1036-1042 (Abstract only).

*Primary Examiner* — James A Fiorito
(74) *Attorney, Agent, or Firm* — Oblon, McClelland, Maier & Neustadt, L.L.P.

(57) ABSTRACT

A method of forming an alkali metal-doped calcium-SiAlON material is provided. The method includes mixing calcium-SiAlON powder and an alkali metal hydroxide to form a reaction mixture. The mixture further includes spark plasma sintering (SPS) the reaction mixture at 800 to 940 degrees Celsius (° C.) to form the alkali metal-doped calcium-SiAlON material. The alkali metal hydroxide is present in an amount of 0.1 to 10 weight percentage (wt. %), based on a total weight of the reaction mixture.

14 Claims, 16 Drawing Sheets

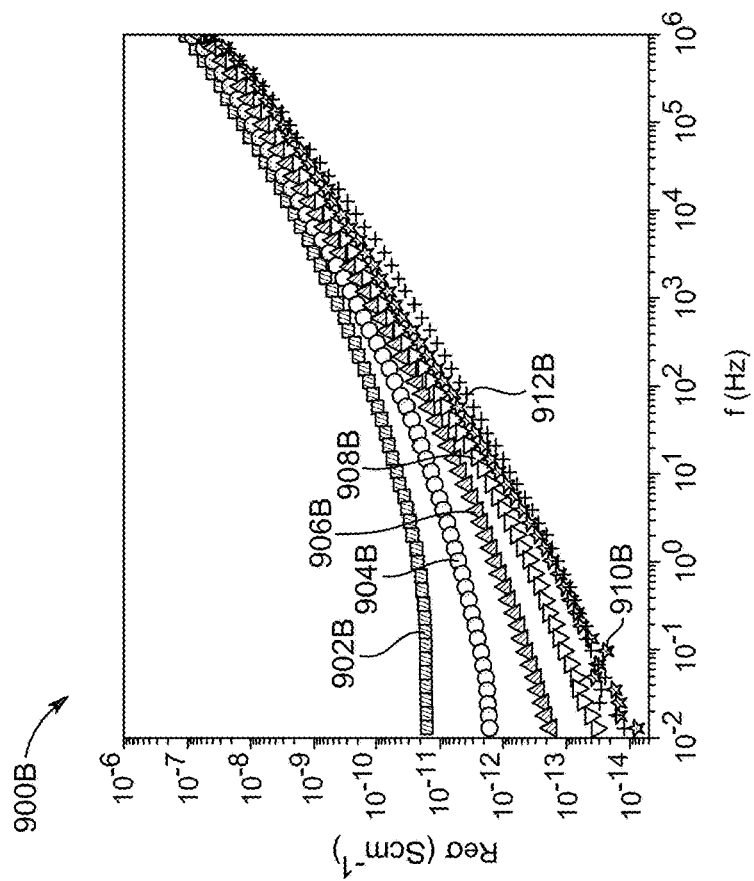
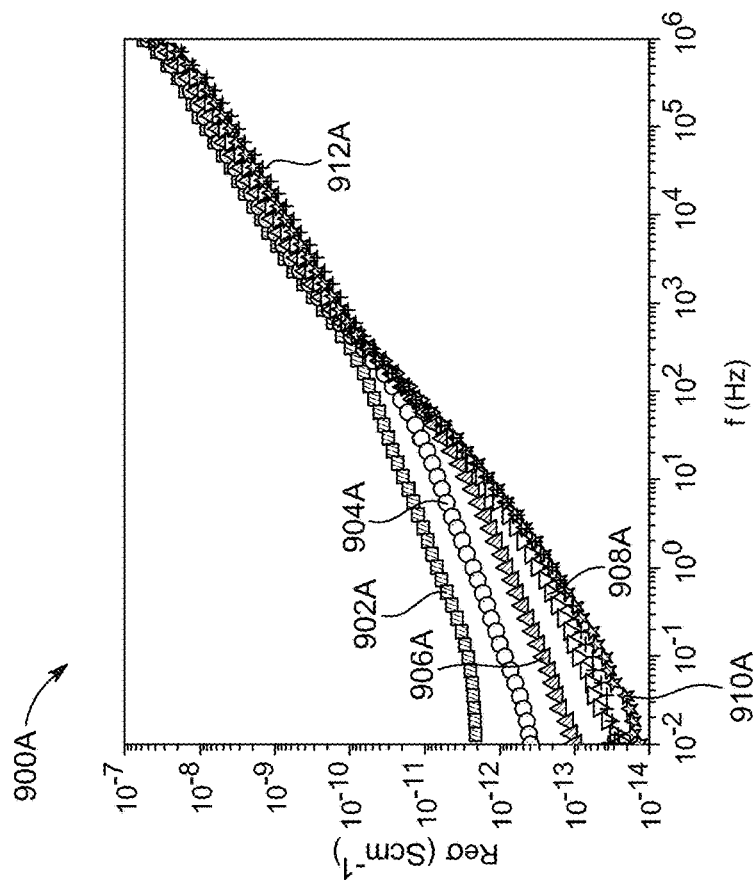
FIG. 9A
FIG. 9B

METHOD OF FORMING AN ALKALI METAL-DOPED CALCIUM-SiAlON MATERIAL

BACKGROUND

Technical Field

The present disclosure is directed to a method of making SiAlON materials, and particularly to a method of making an alkali metal-doped calcium-SiAlON material.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Glass ceramics exhibit valuable properties such as high strength and hardness, low density, wear resistance, and corrosion resistance, with an ability to retain such properties at high temperatures. Generally, fabrication of the glass-ceramics includes a heat treatment in which a glass is re-heated in a furnace above the glass transition temperature at atmospheric pressure while nucleation and crystallization occur. Such heat treatment is time-consuming and limits the extent and scope of microstructure and property optimization of the glass ceramics. Hence, efficient methods need to be developed to overcome the aforementioned limitations.

SUMMARY

According to a first aspect, a method of forming an alkali metal-doped calcium-SiAlON material is described. The method includes mixing calcium-SiAlON powder and an alkali metal hydroxide to form a reaction mixture. The method further includes spark plasma sintering (SPS) the reaction mixture at 800 to 940 degrees Celsius (° C.) to form the alkali metal-doped calcium-SiAlON material. The alkali metal hydroxide is present in an amount of 0.1 to 10 weight percentage (wt. %), based on a total weight of the reaction mixture.

In some embodiments, the calcium-SiAlON powder has a formula of $Ca_{11}Al_{14}Si_{16}O_{49}N_{10}$.

In some embodiments, the method further includes preparing the calcium-SiAlON powder by mixing calcium hydride, aluminum oxide, silicon nitride, and silica to form a precursor mixture. The method further includes calcining the precursor mixture at 1400 to 1800° C. under a nitrogen-containing atmosphere to form calcium-SiAlON solid. Furthermore, the method includes milling the calcium-SiAlON solid to form the calcium-SiAlON powder.

In some embodiments, the calcium-SiAlON powder is amorphous by Powder X-ray Diffraction (PXRD).

In some embodiments, the spark plasma sintering (SPS) is performed at a pressure of 10 to 30 megapascals (MPa).

In some embodiments, the spark plasma sintering (SPS) is performed under a vacuum or an inert atmosphere.

In some embodiments, the alkali metal hydroxide is present in an amount of 1 to 6 wt. %, based on a total weight of the reaction mixture.

In some embodiments, the alkali metal-doped calcium-SiAlON material includes 0.1 to 10 wt. % alkali metal based on a total weight of alkali metal-doped calcium-SiAlON material.

In some embodiments, the alkali metal hydroxide is lithium hydroxide and the alkali metal-doped calcium-SiAlON material is a lithium-doped calcium-SiAlON material.

In some embodiments, the lithium-doped calcium-SiAlON material includes crystalline $Li(AlSi_2O_6)$ by PXRD.

In some embodiments, the alkali metal-doped calcium-SiAlON material has a density of 2.7 to less than 2.81 grams per cubic centimeter ($g/cm^3$).

In some embodiments, the alkali metal-doped calcium-SiAlON material has an elastic modulus ($E_r$) of 110 to less than 124 gigapascals (GPa).

In some embodiments, the alkali metal-doped calcium-SiAlON material has a direct current (D.C.) conductivity ($\sigma_{DC}$) of greater than $10^{-11}$ to $10^{-6}$ siemens per centimeter ($S \cdot cm^{-1}$) at a temperature of 623 kelvin (K).

In some embodiments, the alkali metal-doped calcium-SiAlON material has a real part of an alternating current (A.C.) conductivity ($Re\sigma_{AC}$) of greater than $10^{-11}$ to $10^{-6}$ $S \cdot cm$ at a temperature of 623 K, a real impedance (Z') of $10^5$ to less than $10^{11} \Omega$ at $10^{-2}$ to $10^{-1}$ hertz (Hz) at a temperature of 613 K, an imaginary part of impedance (Z") of $10^5$ to less than $10^{11} \Omega$ at $10^{-2}$ to $10^{-1}$ Hz at a temperature of 613 K, and a maximum imaginary impedance (Z") which occurs at a frequency of greater than $10^{-1}$ to $10^5$ Hz at a temperature of 613 K.

In another exemplary embodiment, the alkali metal-doped calcium-SiAlON material is described. The material includes calcium-SiAlON matrix having a formula $Ca_{11}Al_{14}Si_{16}O_{49}N_{10}$ and 0.1 to 10 wt. % an alkali metal hydroxide distributed within the calcium-SiAlON matrix.

In some embodiments, the alkali metal hydroxide is the lithium hydroxide. The alkali metal-doped calcium-SiAlON material is the lithium-doped calcium-SiAlON material. The lithium-doped calcium-SiAlON material includes the crystalline $Li(AlSi_2O_6)$ by the PXRD.

In some embodiments, the alkali metal-doped calcium-SiAlON material has the density of 2.7 to less than 2.81 $g/cm^3$.

In some embodiments, the alkali metal-doped calcium-SiAlON material has the elastic modulus (Er) of 110 to less than 124 GPa.

In some embodiments, the alkali metal-doped calcium-SiAlON material has the D.C. conductivity ($\sigma_{DC}$) of greater than $10^{-11}$ to $10^{-6}$ $S \cdot cm$ at the temperature of 623 K.

In some embodiments, the alkali metal-doped calcium-SiAlON material has the real part of A.C. conductivity ($Re\sigma_{AC}$) of greater than $10^{-11}$ to $10^{-6}$ $S \cdot cm$ at the temperature of 623 K, the real impedance (Z') of $10^5$ to less than $10^{11} \Omega$ at $10^{-2}$ to $10^{-1}$ Hz at the temperature of 613 K, the imaginary part of impedance (Z") of $10^5$ to less than $10^{11} \Omega$ at $10^{-2}$ to $10^{-1}$ Hz at the temperature of 613 K, and the maximum imaginary impedance (Z") which occurs at the frequency of greater than $10^{-1}$ to $10^5$ Hz at the temperature of 613 K.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 9A is a plot illustrating the A.C. conductivity as a function of frequency for the undoped calcium-SiAlON (G0), according to certain embodiments;

FIG. 9B is a plot depicting the A.C. conductivity as a function of frequency for the calcium-SiAlON doped with 1 wt. % of Li-ions (G1), according to certain embodiments;

DETAILED DESCRIPTION

Figure 1:
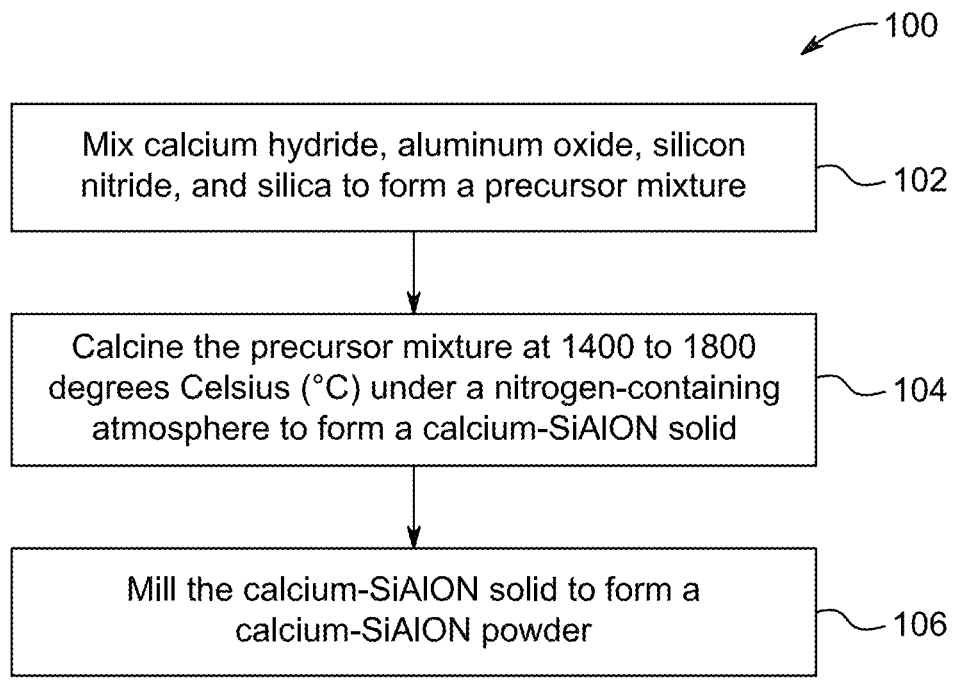
FIG. 1 is a flow chart of a method of preparing calcium-SiAlON powder, according to certain embodiments of the present disclosure.

Embodiments of the present disclosure will now be described more fully hereinafter with reference to the accompanying drawings, in which some, but not all embodiments of the disclosure are shown.

The present disclosure will be better understood with reference to the following definitions. As used herein, the words "a" and "an" and the like carry the meaning of "one or more." Within the description of this disclosure, where a numerical limit or range is stated, the endpoints are included unless stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

As used herein, "compound" is intended to refer to a chemical entity, whether as a solid, liquid, or gas, and whether in a crude mixture or isolated and purified.

As used herein, "composite" refers to a combination of two or more distinct constituent materials into one. The individual components, on an atomic level, remain separate and distinct within the finished structure. The materials may have different physical or chemical properties, that when combined, produce a material with characteristics different from the original components. In some embodiments, a composite may have at least two constituent materials that comprise the same empirical formula but are distinguished by different densities, crystal phases, or a lack of a crystal phase (i.e. an amorphous phase).

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of carbon include $^{13}C$ and $^{14}C$. Isotopes of nitrogen include $^{14}N$ and $^{15}N$. Isotopes of oxygen include $^{16}O$, $^{17}O$, and $^{18}O$. Isotopes of silicon include $^{28}Si$, $^{29}Si$, and $^{30}Si$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

As defined here, a ceramic or a ceramic material is an inorganic, oxide, nitride, or carbide material. Ceramics are typically crystalline and non-metallic. Some elements, such as carbon or silicon, may be considered ceramics. However, some ceramics may contain metal ions, such as $Ca^{2+}$, interspersed within its structure. Ceramic materials are generally resistive against compression, but yield somewhat to shearing, fracturing, and tension, as compared to metals and metal alloys. Ceramics can typically withstand chemical erosion that occurs in other materials subjected to acidic or caustic environments. Ceramics generally can withstand very high temperatures without degrading, such as temperatures that range from 1,000° C. to 1,600° C. Glass is not considered a ceramic because of its amorphous (noncrystalline) character. A "ceramic composite," or "ceramic matrix composite," refers to a composite where at least one of the constituent materials is a ceramic. Furthermore, "ceramic composite," is considered synonymous with "composite ceramic."

Sialons are ceramics based on their component elements silicon (Si), aluminum (Al), oxygen (O) and nitrogen (N), and also may be denoted as "SiAlON" or "SiAlONs." As ceramics, sialon materials comprise a solid solution of silicon nitride and alumina, and may be classified into multiple phases based on different empirical formula, crystal structures, microstructure, and thermo-mechanical properties. The most common phases are α-sialon ("alpha-sialon") and β-sialon ("beta-sialon"), however, other phases may be possible such as O-sialon or X-sialon. A single sialon material may have one phase or a mixture of more than one phase, such as a mixture of alpha and beta phases. Various types of sialon in both alpha and beta phases have been intensely studied during the past two decades due to their remarkable mechanical properties, specifically the high hardness in alpha-sialon and the modest fracture toughness in beta-sialon. See Izhevskiy, V. A. et al. *J. Eur. Ceram. Soc* 20 (2000) 2275-95 and Ekström, T. et al. "Sialon Ceramics." *J. Am. Ceram. Soc* 75 (1992) 259-76.

According to a first aspect, the present disclosure relates to a method of forming an alkali metal-doped calcium-SiAlON material. The method comprises mixing calcium-SiAlON powder and an alkali metal hydroxide to form a reaction mixture, and spark plasma sintering (SPS) the reaction mixture at 800 to 940 degrees Celsius (° C.) to form the alkali metal-doped calcium-SiAlON material. The alkali metal hydroxide is present in the reaction mixture an amount of 0.1 to 10 weight percentage (wt. %), based on a total weight of the reaction mixture.

In some embodiments, the calcium-SiAlON powder has a formula of $Ca_{11}Al_{14}Si_{16}O_{49}N_{10}$. In some embodiments, the calcium-SiAlON powder may be prepared by a method involving mixing calcium hydride, aluminum oxide, silicon nitride, and silica to form a precursor mixture and calcining the precursor mixture at 1400 to 1800° C., preferably 1450 to 1775° C., preferably 1500 to 1750° C., preferably 1550 to 1725° C., preferably 1600 to 1700° C., preferably 1625 to 1675° C., preferably 1650° C., under a nitrogen-containing atmosphere to form a calcium-SiAlON solid.

In general, the components of the precursor mixture (e.g. the calcium hydride, aluminum oxide, silicon nitride, and silica) may be in the form of particles. Such particles may have a spherical shape, or may be shaped like cylinders, boxes, spikes, flakes, plates, ellipsoids, toroids, stars, ribbons, discs, rods, granules, prisms, cones, flakes, platelets, sheets, or some other shape. A diameter of a particle, as used herein, refers to the greatest possible distance measured from one point on the particle through the center of the particle to a point directly across from it. A diameter of a flake, as used herein, refers to the greatest possible distance measured from a first point on a perimeter of the flake through the center of the flake to a second point, also on the perimeter of the flake, directly across from the first point. In one embodiment, the particles having the same chemical composition (e.g. the aluminum oxide particles) may be substantially spherical, meaning that the distance from the particle centroid (center of mass) to anywhere on the particle outer surface varies by less than 30%, preferably by less than 20%, more preferably by less than 10% of the average distance.

In one embodiment, particles having the same chemical composition are monodisperse, having a coefficient of variation or relative standard deviation, expressed as a percentage and defined as the ratio of the particle diameter standard deviation (σ) to the particle diameter mean (μ), multiplied by 100%, of less than 25%, preferably less than 10%, preferably less than 8%, preferably less than 6%, preferably less than 5%. In a preferred embodiment, the particles are monodisperse having a particle diameter distribution ranging from 80% of the average particle diameter to 120% of the average particle diameter, preferably 85-115%, preferably 90-110% of the average particle diameter. In another embodiment, the particles are not monodisperse In one embodiment, the particles are clustered in agglomerates. As used herein, the term "agglomerates" refers to a clustered particulate composition comprising primary particles, the primary particles being aggregated together in such a way so as to form clusters thereof, at least 50 volume percent of the clusters having a mean diameter that is at least 2 times the mean diameter of the primary particles, and preferably at least 90 volume percent of the clusters having a mean diameter that is at least 5 times the mean diameter of the primary particles.

In some embodiments, the aluminum oxide is present as particles having a mean diameter ranging from 1 to 200 nm, preferably 10 to 100 nm, more preferably 15 to 60 nm. In general, the aluminum oxide may be any suitable phase of aluminum oxide known to one of ordinary skill in the art, such as α-alumina, γ-alumina, η-alumina, θ-alumina, δ-alumina, χ-alumina, κ-alumina, or combinations thereof. In one embodiment, the alumina is α-alumina. In some embodiments, the aluminum oxide has a purity of at least 99 wt %, preferably at least 99.5 wt %, more preferably at least 99.8 wt % relative to the total weight of the aluminum oxide.

In some embodiments, the silica ($SiO_2$) is present as particle having a mean diameter in a range of 5 to 200 nm, preferably 6 to 100 nm, more preferably 8 to 50 nm, even more preferably 9 to 35 nm, or 10 to 30 nm, 12 to 25 nm, or 13 to 20 nm. The $SiO_2$ may comprise fumed silica, hydrophobic silica, amorphous silica, precipitated silica, α-quartz, β-quartz, α-tridymite, β-tridymite, α-cristobalite, β-cristobalite, some other silica, or any mixture thereof.

In some embodiments, the silicon nitride is present as particles a mean diameter in a range of 15 nm to 60 μm. In one embodiment, the particles of silicon nitride are nanoparticles having a mean diameter in a range of 15 to 100 nm, preferably 17 to 80 nm, preferably 18 to 50 nm, more preferably 20 to 40 nm, 22 to 38 nm, or 25 to 35 nm. In another embodiment, the particles of silicon nitride are microparticles having a mean diameter in a range of 25 to 55 μm, preferably 30 to 52 μm, more preferably 35 to 50 μm, even more preferably 38 to 48 μm, or about 44 μm. In some embodiments, the silicon nitride has a purity of more than 98 wt %, preferably more than 99 wt %, more preferably more than 99.9 wt % relative to the total weight of the silicon nitride particles. In general, the silicon nitride may be α-$Si_3N_4$, β-$Si_3N_4$, γ-$Si_3N_4$, amorphous $Si_3N_4$, or mixtures thereof. In one embodiment, where the silicon nitride particles are nanoparticles, the silicon nitride is amorphous $Si_3N_4$. In another embodiment, where the silicon nitride particles are microparticles, the silicon nitride is β-$Si_3N_4$.

The calcining may be performed under any suitable nitrogen-containing atmosphere. Such an atmosphere may further comprise oxygen. In general, the atmosphere may further comprise suitable inert gases, such as argon, helium, neon, carbon dioxide, and the like.

After forming the calcium-SiAlON solid, the calcium-SiAlON powder may be formed by milling the calcium-SiAlON solid. In general, the milling may be performed by any suitable technique or with any suitable equipment known to one of ordinary skill in the art. Examples of such techniques include, but are not limited to, grinding, ball milling, chopping, pulverizing, crushing, pounding, mincing, shredding, smashing, and fragmenting. In some embodiments, the milling may take place using a mill, ball mill, rod mill, autogenous mill, cutting mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles.

In some embodiments, the calcium-SiAlON powder is amorphous by Powder X-ray Diffraction (PXRD).

FIG. 1 illustrates a flow chart of a method 100 of preparing calcium-SiAlON powder. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes preparing the calcium-SiAlON powder by mixing calcium hydride ($CaH_2$), aluminum oxide ($Al_2O_3$), silicon nitride ($Si_3N_4$), and silica ($SiO_2$) to form a precursor mixture. In some embodiments, the precursor mixture may also include aluminum nitride (AlN).

At step 104, the method 100 includes calcining the precursor mixture at 1400 to 1800° C. under a nitrogen-containing atmosphere to form calcium-SiAlON solid.

At step 106, the method 100 includes milling the calcium-SiAlON solid to form the calcium-SiAlON powder. In some embodiments, the calcium-SiAlON powder has a ratio of Al to Si of 1:0.5 to 1:2, preferably 1:0.75 to 1:1.75, preferably 1:0.9 to 1:1.5, preferably 1:1 to 1:1.25, preferably 1:1.125. In some embodiments, the calcium-SiAlON powder has a ratio of 0 to N of 4:1 to 6:1, preferably preferably 4:25:1 to 5.75:1, preferably 4.5:1 to 5.5:1, preferably 4.75:1 to 5.25:1, preferably 4.9:1. In some embodiments, the calcium-SiAlON powder has a ratio of Ca to (Si+Al) of 1:2 to 1:3.5, preferably 1:2.25 to 1:3.25, preferably 1:2.5 to 1:3, preferably 1:2.6 to 1:2.9, preferably 1:2.7 to 1:2.8. In some embodiments, the calcium-SiAlON powder has formula of $Ca_{11}Al_{14}Si_{16}O_{49}N_{10}$. In some embodiments, the calcium-SiAlON powder is amorphous by PXRD.

Figure 2:
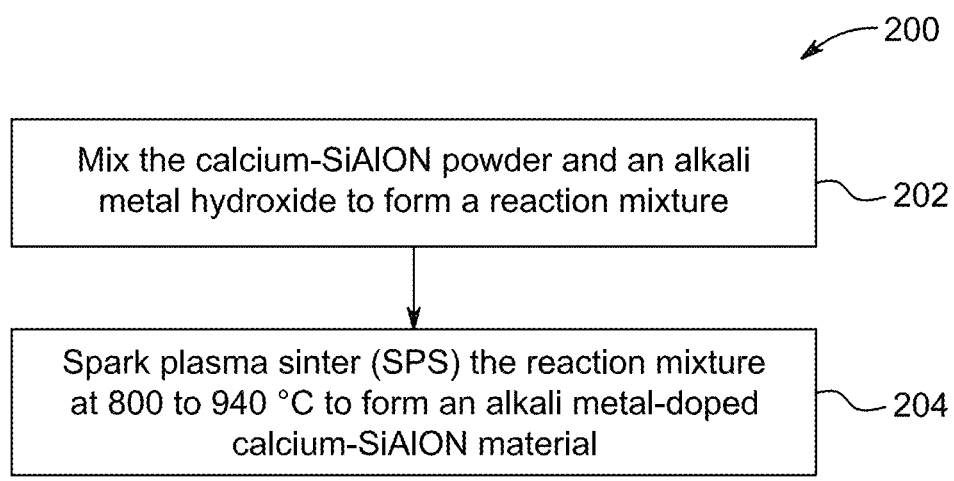
FIG. 2 is a flow chart of a method of forming an alkali metal-doped calcium-SiAlON material, according to certain embodiments of the present disclosure.

FIG. 2 illustrates a flow chart of a method 200 of forming the alkali metal-doped calcium-SiAlON material. The order in which the method 200 is described is not intended to be construed as a limitation, and any number of the described method steps can be combined in any order to implement the method 200. Additionally, individual steps may be removed or skipped from the method 200 without departing from the spirit and scope of the present disclosure.

At step 202, the method 200 includes mixing the calcium-SiAlON powder and the alkali metal hydroxide to form a reaction mixture. In some embodiments, the alkali metal hydroxide is the lithium hydroxide. In some embodiments, the alkali metal hydroxide is present in an amount of 0.1 to 10 wt %, preferably 0.25 to 9 wt %, preferably 0.5 to 8 wt %, preferably 0.6 to 7.5 wt %, preferably 0.75 to 7 wt %, preferably 0.9 to 6.5 wt %, preferably 1 to 6 wt %, based on a total weight of the reaction mixture.

In some embodiments, the mixing involves milling as described above.

At step 204, the method 200 includes spark plasma sintering (SPS) the reaction mixture at 800 to 940° C., preferably 825 to 930° C., preferably 850 to 920° C., preferably 875 to 910° C., preferably 900° C. to form the alkali metal-doped calcium-SiAlON material. Preferably, the sintering should be performed at a temperature which is below the glass transition temperature ($T_g$) of the calcium-SiAlON powder and/or the alkali metal-doped calcium-SiAlON material. The glass-transition temperature $T_g$ of a material characterizes the range of temperatures over which a glass transition occurs. It is always lower than the melting temperature, Tm, of the crystalline state of the material, if one exists. The glass transition is the reversible transition in amorphous materials (or in amorphous regions within semicrystalline materials) from a hard and relatively brittle "glassy" state into a viscous or rubbery state as the temperature is increased. The glass transition temperature ($T_g$) may be defined based on a measurable physical or chemical property of the material. For example, $T_g$ may be based on the viscosity, thermal expansion, heat capacity, or sheer modulus. In some embodiments, the $T_g$ may be based on a calorimetric property of the calcium-SiAlON powder or the alkali metal-doped calcium-SiAlON material. In such embodiments, $T_g$ may be determined by differential thermal analysis (DTA). In some embodiments, the calcium-SiAlON powder or the alkali metal-doped calcium-SiAlON material has a $T_g$ of 940 to 950° C. In such embodiments, the SPS is preferably performed at a temperature below 940° C.

In some embodiments, the SPS is performed at a pressure of 10 to 30 MPa, preferably 11 to 29 MPa, preferably 12 to 28 MPa, preferably 13 to 27 MPa, preferably 14 to 26 MPa, preferably 15 to 25 MPa, preferably 16 to 24 MPa, preferably 17 to 23 MPa, preferably 18 to 22 MPa, preferably 19 to 21 MPa, preferably 20 MPa. In some embodiments, the spark plasma sintering method uses a heating rate of 10 to 200° C./min, preferably 25 to 175° C./min, preferably 50 to 150° C./min, preferably 60 to 140° C./min, preferably 70 to 130° C./min, preferably 80 to 120° C./min, preferably 90 to 110° C./min, preferably 95 to 105° C./min, preferably 100° C./min. In some embodiments, the spark plasma sintering method uses a soaking time of 1 to 60 minutes, preferably 10 to 50 minutes, preferably 15 to 45 minutes, preferably 20 to 40 minutes, preferably 22.5 to 37.5 minutes, preferably 25 to 35 minutes, preferably 27.5 to 32.5 minutes, preferably 30 minutes.

In some embodiments, the SPS is performed under a vacuum or an inert atmosphere. In some embodiments, the inert atmosphere has a pressure of 0.5 to 2.5 mTorr, preferably 0.75 to 2.5 mTorr, preferably 1 to 2 mTorr. In some embodiments, the inert atmosphere is provided by argon gas. In some embodiments, the inert atmosphere is provided by nitrogen gas. In some embodiments, the inert atmosphere is provided by helium gas. In some embodiments, the SPS is performed in a vacuum having a pressure of at most 1 mbar, preferably 0.75 mbar, preferably 0.5 mbar, preferably 0.1 mbar, preferably 0.075 mbar, preferably 0.05 mbar.

In some embodiments, the spark plasma sintering is performed in a graphite die. In some embodiments, the polishing involves removing surface contamination with abrasives. In some embodiments, the abrasives have a grit size ranging from 100 to 1500, preferably 120 to 1400, preferably 150 to 1300, preferably 180 to 1200. In some embodiments, the polishing involves grinding with a silicon carbide abrasive.

In some embodiments, the alkali metal-doped calcium-SiAlON material (herein after "the material") comprises a calcium-SiAlON matrix and 0.1 to 10 wt. % preferably 0.25 to 9 wt %, preferably 0.5 to 8 wt %, preferably 0.6 to 7.5 wt %, preferably 0.75 to 7 wt %, preferably 0.9 to 6.5 wt %, preferably 1 to 6 wt % of an alkali metal hydroxide distributed within the calcium-SiAlON matrix, based on a total weight of the material. In some embodiments, the alkali metal hydroxide is lithium hydroxide. In some embodiments, the alkali metal-doped calcium-SiAlON material is the lithium-doped calcium-SiAlON material. The lithium-doped calcium-SiAlON material comprises crystalline $Li(AlSi_2O_6)$ by PXRD.

In some embodiments, the calcium-SiAlON matrix has a formula of $Ca_{11}Al_{14}Si_{16}O_{49}N_{10}$. In some embodiments, the material has a density of 2.7 g/cm³ to less than 2.81 g/cm³, preferably 2.73 to 2.80 g/cm³, preferably 2.75 to 2.90 g/cm³, preferably 2.76 to 2.785 g/cm³, preferably 2.77 to 2.78 g/cm³. In some embodiments, the material has an elastic modulus (Er) of 110 GPa to less than 124 GPa, preferably 111 to 123 GPa, preferably 112 to 122 GPa, preferably 114 to 121 GPa.

In some embodiments, the material has a direct current (D.C.) conductivity ($\sigma_{DC}$) of greater than $10^{-11}$ to $10^{-6}$ S·cm⁻¹, preferably $5\times10^{-1}$ to $10^{-7}$, preferably $10^{-10}$ to $10^{-5}$ S·cm⁻¹ S·cm at a temperature of 623 K. In some embodiments, the material has a real part of an alternate current (A.C.) conductivity ($Re\sigma_{AC}$) of greater than $10^{-11}$ to $10^{-6}$ S·cm⁻¹ preferably $5\times10^{-11}$ to $10^{-7}$, preferably $10^{-10}$ to $10^{-5}$ S·cm⁻¹ at a temperature of 623 K. In some embodiments, the material has a a real impedance (Z') of $10^5$ to less than $10^{11}\Omega$, preferably $10^6$ to $5\times10^{-10}\Omega$, preferably $10^7$ to $10^{10}\Omega$ at $10^{-2}$ to $10^{-1}$ Hz at a temperature of 613 K. In some embodiments, the material has an imaginary part of impedance (Z") of $10^5$ to less than $10^{11}\Omega$, preferably $10^6$ to $5\times10^{10}\Omega$, preferably $10^7$ to $10^{10}\Omega$ at $10^{-2}$ to $10^{-1}$ Hz at a temperature of 613 K. In some embodiments, the material has a maximum imaginary impedance (Z") which occurs at a frequency of greater than $10^{-1}$ to $10^5$ Hz, preferably $5\times10^0$ to $10^4$ Hz at a temperature of 613 K.

The examples below are intended to further illustrate protocols for preparing and characterizing the alkali metal-doped calcium-SiAlON material and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Materials and Method of Preparation

Oxynitride glass, also referred to as the parent glass, with a composition of $Ca_{11}Al_{14}Si_{16}O_{49}N_{10}$ was prepared at 1650° C. using a radio frequency furnace. Powders such as $CaH_2$ (95% metal basis, Alfa Aesar GmbH & Co.), $Al_2O_3$ (99% ChemPur GmbH), $Si_3N_4$ (99% ChemPur GmbH), $SiO_2$ (99.9%, ABCR GmbH & Co) were used to prepare a mixture for the parent glass. 22 g of the mixture was melted in a niobium (Nb) crucible in a nitrogen atmosphere to form the parent glass, which was then ground to particles to form a re-grinded glass matrix. The Li-ions source was introduced to the re-grinded glass matrix before the spark plasma sintering (SPS) (HP D5, FCT Systems, Frankenblick, Germany). 5 g of $Ca_{11}Al_{14}Si_{16}O_{49}N_{10}$ glass powder was mixed with 1, 3, and 6 wt. % of lithium to form a reaction mixture. LiOH was used as the Li-ions source. Additionally, 5 g of soda-lime-silicate glass powder, also called as the float glass powder, was doped with 6 wt. % of the Li-ions (FG6) for comparison purposes. Pristine $Ca_{11}Al_{14}Si_{16}O_{49}N_{10}$ glass (G), undoped $Ca_{11}Al_{14}Si_{16}O_{49}N_{10}$ glass (G0), the $Ca_{11}Al_{14}Si_{16}O_{49}N_{10}$ glass doped with 1 wt. % of the Li-ions (G1), the $Ca_{11}Al_{14}Si_{16}O_{49}N_{10}$ glass doped with 3 wt. % of the Li-ions (G3), the $Ca_{11}Al_{14}Si_{16}O_{49}N_{10}$ glass doped with 6 wt. % of the Li-ions (G6) and FG6 are collectively referred to as 'the samples' or individually referred to as 'the sample', unless specified. For additional information regarding the details of the preparation, see: [S. Ali, & B. Jonson, J. Am. Ceram. Soc., 2011, 94, 2912-2917; Hakeem, A. S., et. al., Adv. Mater., 2005, 17, 2214-2216; Hakeem, A. S., et. al., J. Eur. Cerm. Soc., 2007, 27, 16, 4773-4781; A. Sharafat, & J. Bo, J. Eur. Ceram. Soc., 2011, 31, 611-618; A. Sharafat, et. al., J. Mater. Sci., 2009, 44, 664-670; and A. Sharafat, et. al., J. Eur. Ceram. Soc., 2008, 28, 2659-2664, each of which is incorporated herein by reference in its entirety].

The reaction mixture of the Li-ions and $Ca_{11}Al_{14}Si_{16}O_{49}N_{10}$ was poured into a 20-millimeter (mm) diameter graphite die. A constant uniaxial pressure of 20 MPa was applied at room temperature (RT) prior to the sintering at 900° C. (just below the pristine glass transition temperature, 940° C.), with a heating rate of 100° C./min, and a soaking time of 30 minutes. The float glass powder doped with the Li ions was sintered at 600° C., and a uniaxial pressure of 18 MPa was applied as the powder sample melted when sintered at 750° C. The sintering was performed in a vacuum with a starting pressure of $5\times10^2$ millibars (mbar).

Figure 3A:
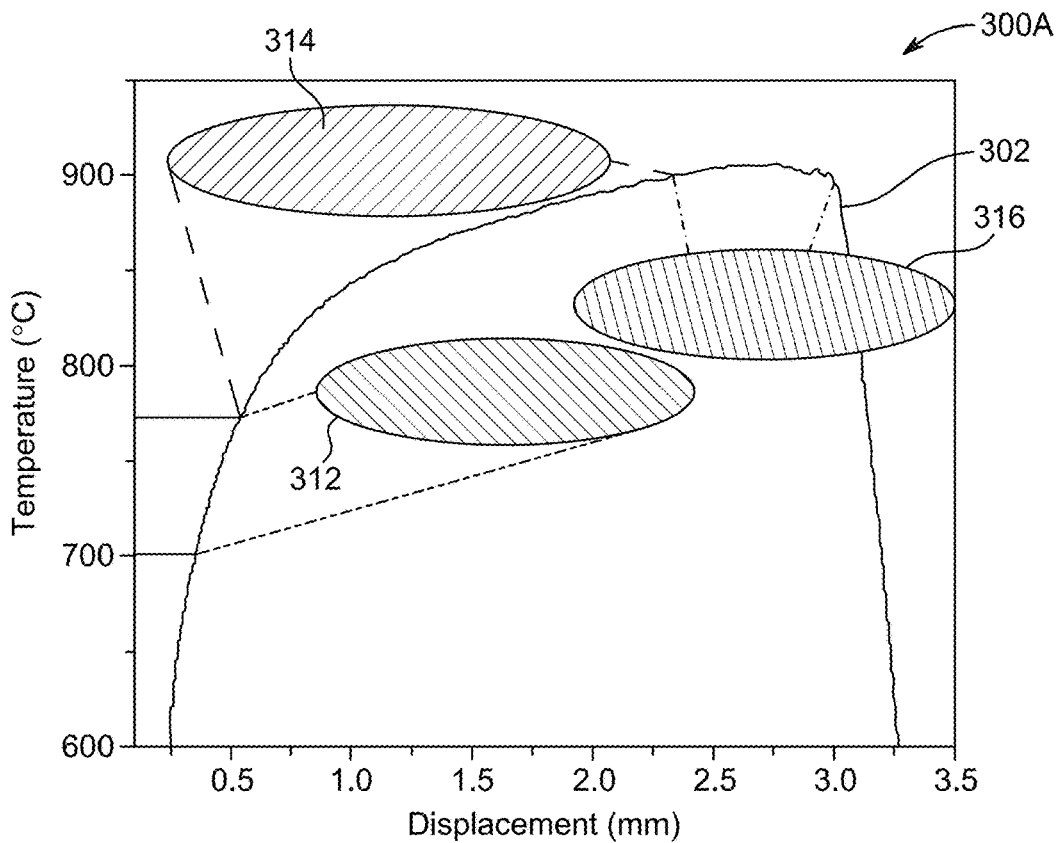
FIG. 3A depicts a spark plasma sintering (SPS) shrinkage curve for calcium-SiAlON doped with 6 wt. % of the Li-ions (G6), according to certain embodiments of the present disclosure.
Figure 3B:
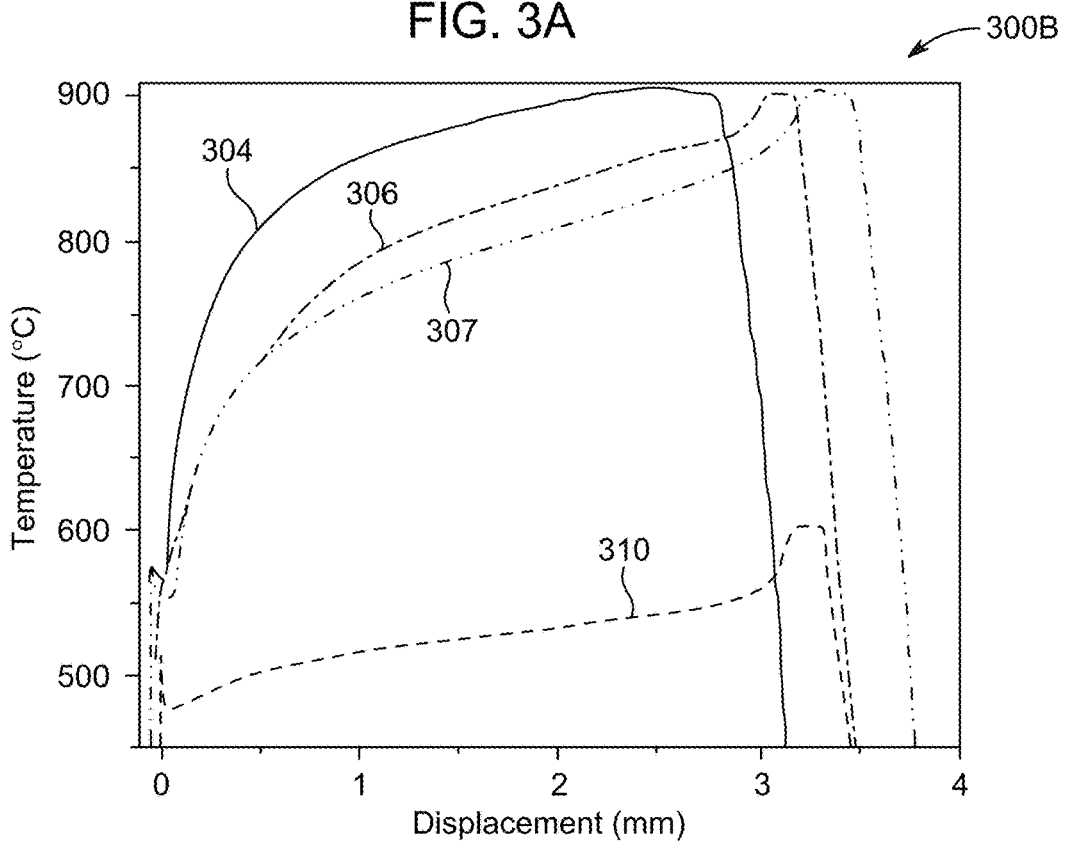
FIG. 3B depicts the SPS shrinkage curves for one or more samples, according to certain embodiments of the present disclosure.

FIGS. 3A-3B illustrate the SPS shrinkage curves 300A and 300B for sample G6 (302) and samples G1 (304), G3 (306), G6 (307), and FG6 (310), respectively. FIG. 3A shows one or more stages of the sintering of the sample G6. FIG. 3B follows the same trend as that of FIG. 3A. FIG. 3A shows areas 312, 314 representing a start of re-arrangement of grains and solution-diffusion-precipitation stages/stage, respectively, occurring according to corresponding glass transition temperatures ($T_g$). A densification process occurs at a temperature lower than $T_g$ by about 100° C. This densification process therefore can be ascribed to the presence of applied load during the sintering of the reaction mixture. Because $T_g$ temperatures occur at the end of the re-arrangement of grains, the densification can be attributed to the solution-diffusion-precipitation stage in the densification process. Hence, no substantial impact on the densification behavior is observed as the $T_g$ temperature is similar for the samples G1, G3, and G6. Further, an area 316 represents a coalescence of precipitation stage that appeared at identical temperatures for most of the samples.

Sintered glass-ceramics disks with a diameter of coarse aggregate (c.a.) 20 mm and a thickness of around 5 mm were obtained. A graphite sheet used in the SPS results in a contaminated layer on the surfaces of sintered samples. The layer was removed using SiC abrasive paper (grit sizes ranging from 120 to 1200 grit). A final polishing for microstructure analyses was done using diamond polishing down to 1 micrometer (m) finish.

Characterization

Microstructure observations were carried out with an optical microscope (DSX510, Olympus, Japan) and a SEM (JSM-7000F, JEOL, Japan with Schottky-type FEG) equipped with an energy-dispersive X-ray spectrometer (EDS detector, Oxford Instruments, UK). The SEM was operated at acceleration voltages of 15 kilovolts (kV), and specimen images were acquired in backscattered electron mode. X-ray diffraction (XRD) 2θ scans were performed to determine the nature (amorphous/crystalline) of the pristine glass (G0) and glass ceramics after SPS respectively, by using a Panalytical X'pert PRO MPD diffractometer equipped with a Cu Kα (1.5401 Å) source operated at 45 kV and 40 milliamperes (mA).

Densities were measured using the Archimedes principle in de-ionized water ($\rho_{H2O}$=0.998 g/cm$^3$) and corrected for its temperature within 21.5±0.5° C. A Mettler Toledo density measurement kit was used to determine the density of a solid sample. Hardness ($H_v$) and reduced elastic modulus ($E_r$) of the glass and sintered samples were measured by a nano-indentation method. The nano-indentation method was performed using a Nano Test Vantage instrument from Micro Materials (UK). Loading and unloading curves were produced with a standard Berkovich diamond tip at 20 millinewtons (mN). The Berkovich diamond tip was calibrated on a fused silica sample, and 10 indentations were performed on each sample to get a statistically valid average value. The hardness ($H_v$) and reduced elastic modulus ($E_r$) were calculated by a method of Oliver and Pharr using an elastic unloading part of a load-displacement curve [W. C. Oliver, & G. M. Pharr, J. Mater. Res., 1992, 7, 1564-1583, incorporated herein by reference in its entirety]. Differential thermal analysis (DTA) measurements determined the glass/glass-ceramics transition and crystallization temperature. Measurement was made up to 1400° C. on powdered samples placed in $Al_2O_3$ crucibles and a heating rate of 20° C./min under a flowing nitrogen atmosphere. Netzsch STA 409PC instrument was used. $T_g$ was estimated from an endothermic drift on a DTA curve.

Electrical measurements were conducted in a frequency range from 10 megahertz (MHz) to 1 MHz and a temperature range of 373 K-623 K, with an AC voltage of 1 $V_{rms}$ using a Novocontrol Concept 40 broadband dielectric spectrometer. The temperature was set at 10 K. The temperature was controlled using a high-temperature Novotherm HT 1600 controller. Impedance was measured on plane parallel samples in the air. The sample surfaces were polished and gold electrodes were evaporated in a vacuum prior to measurements being taken. The results were analyzed with the use of Origin 8.5 software.

Glass and Glass-Ceramics Characterization

Figure 4B:
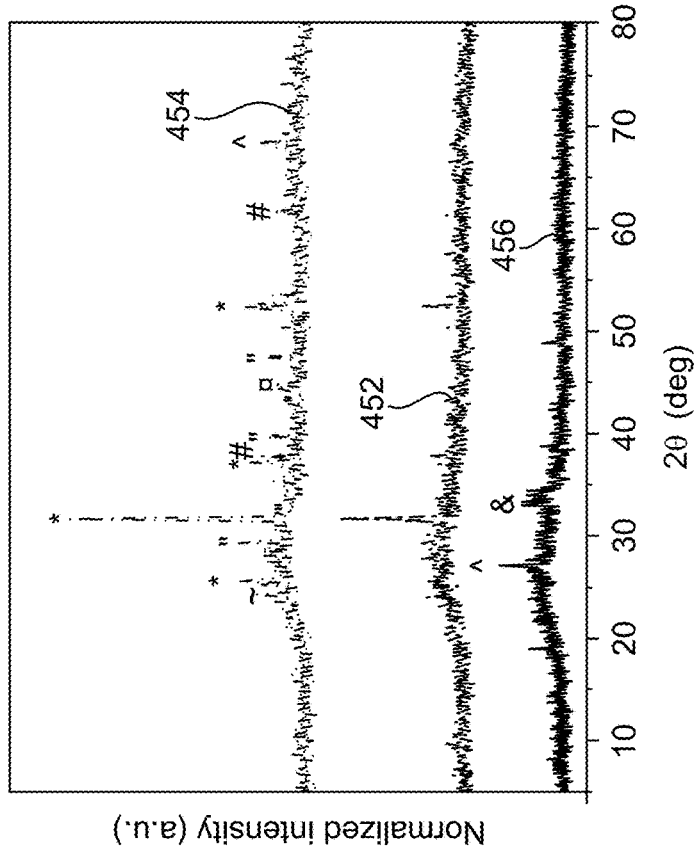
FIG. 4B depicts the XRD spectra of partially crystalline samples, according to certain embodiments of the present disclosure.
Figure 4A:
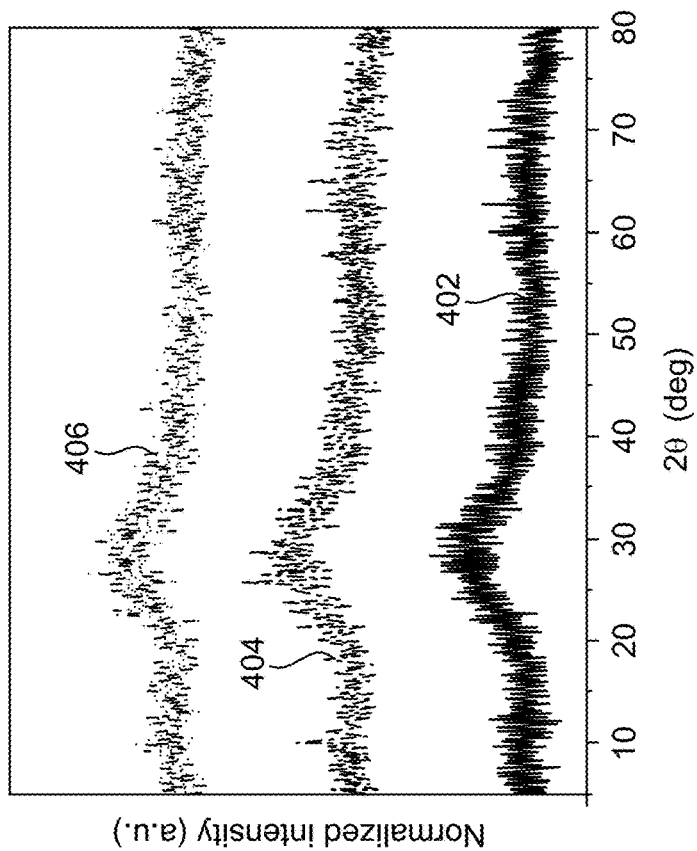
FIG. 4A depicts X-ray diffractions (XRD) spectra of amorphous samples, according to certain embodiments of the present disclosure.

The parent glass prepared by a melt-quenching technique was amorphous, as confirmed by the XRD, and had an opaque brown color. Generally, impurities such as elemental Si and silicides in the glass network make nitrogen-containing silicon base oxynitride glasses less transparent in a visible region. FIGS. 4A-4B illustrate the XRD images of amorphous and partially crystalline samples, respectively. FIG. 4A is the XRD plot 400 for the samples G (402), G0 (404), G1 (406). The XRD plot 400 shows that the samples G, G0, and G1 exhibited an amorphous halo typical for glasses. The samples G0 and G1 remained as glass even after sintering in the SPS at 900° C. according to the XRD analyses. FIG. 4B is the XRD plot 450 for the samples G3 (452), G6 (454), and FG6 (456). These samples also showed the amorphous halo, but also showed sharp reflections of different crystalline phases. The intensities and broadness of the crystalline phase reflections change with the Li-ions content in the glass matrix. Results of the reflections fit are provided in Table 1 and marked in FIG. 4B.

TABLE 1

Results of the crystalline phase reflections fit and corresponding symbols in FIG. 4B

| Symbol | Crystalline phase |
|---|---|
| ~ | $Li_2Si_3O_5$ |
| * | $Li(AlSi_2O_6)$ |
| " | $Ca_3(SiO_3OH)_2 \cdot 2H_2O$ |
| # | $Al_2O_3$ |
| ¤ | LiH |
| ^ | $SiO_2$ |
| & | $Li_2SiO_3$ |

The crystallites in samples G3 and G6 were mainly various lithium silicates. However, there were also reflections indicative of lithium aluminum silicate ($Li(AlSi_2O_6)$), lithium hydride (LiH), aluminum oxides ($Al_2O$ and $Al_2.6O_4$), and silicon oxide ($SiO_2$) were also detected (as shown in FIG. 4B). Hereinafter, the samples G, G0, and G1, are referred to as the glasses, and the samples G3, G6, and FG6, are referred to as the glass-ceramics to underline the morphological differences between the glasses and glass-ceramics.

Figure 5:
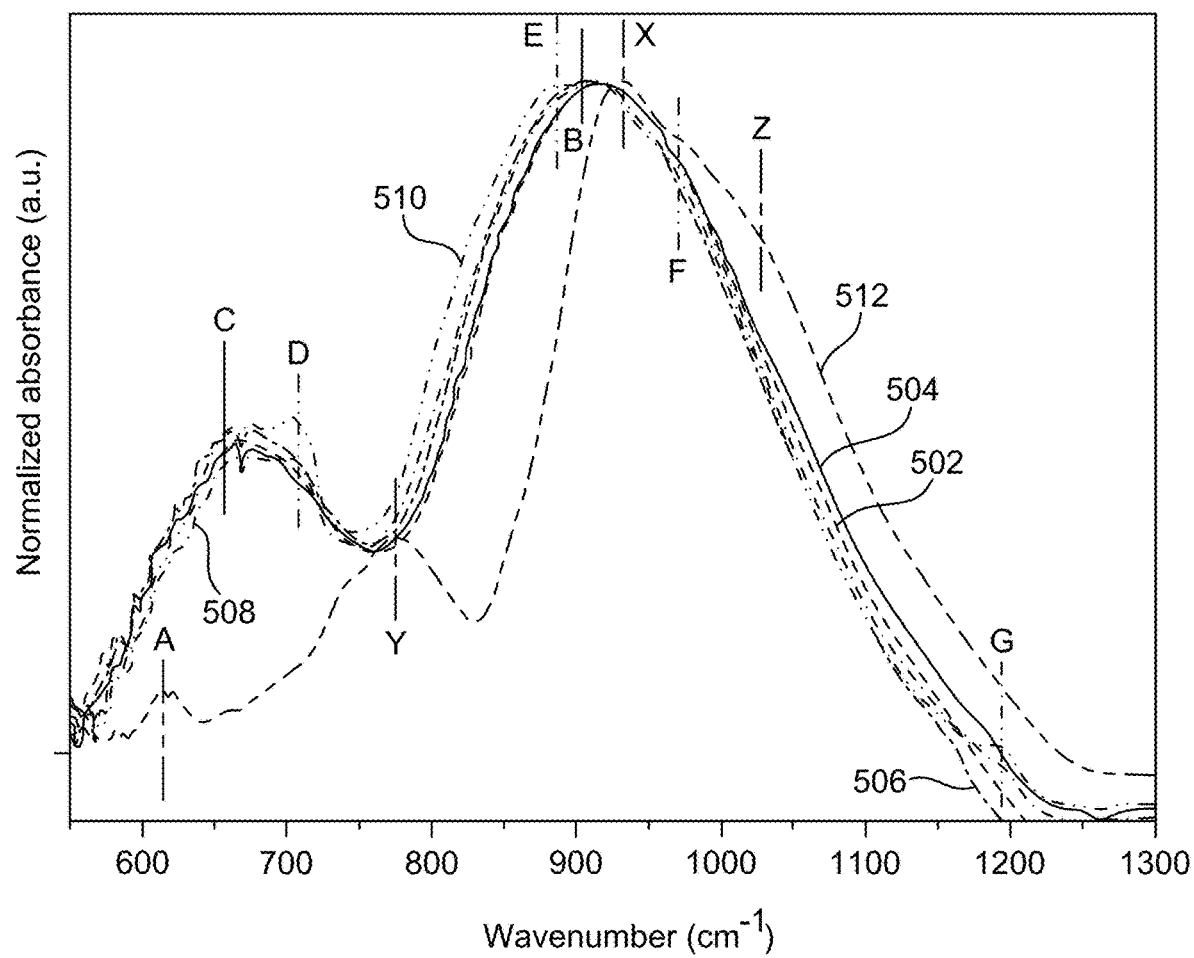
FIG. 5 depicts a Fourier Transform Infrared Spectroscopy (FT-IR) spectra of one or more samples, according to certain embodiments of the present disclosure.

FIG. 5 shows a graph 500 representing FT-IR spectra of the samples G (502), G0 (504), G1 (506), G3 (508), G6 (510), and FG6 (512). The samples showed rounded shapes of the curve bands 502-512 typical of the amorphous samples. The spectra (512) showed points 'X', 'Y,' 'Z,' and 'A' corresponding to 930 cm$^{-1}$, 778 cm$^{-1}$, 1030 cm$^{-1}$ and 616 cm$^{-1}$ frequencies, respectively.

The points 'X' and 'Z' can be attributed to a Si—O band vibration (Q$^2$, silicate tetrahedra with two non-bridging oxygen) and a Si—O—Si stretch band, respectively. The point 'Y' corresponds to Si—O—Si symmetric stretching vibrations of bridging oxygens between two adjacent SiO$_4$ tetrahedra. Further, the point 'A' at 616 cm$^{-1}$ can be attributed to silicate nanocrystallites, such as those detected by PXRD. In silicate glasses, the incorporation of aluminum is mainly considered to play the role of the glass former rather than the glass modifier, especially when the aluminum content is close to that of silica as in the case of tested samples (ratio of Al/Al+Si≈0.47). Moreover, aluminum and silicon have similar masses and ionic ratios, favoring coupling their vibrations. In that case, the presence of the Al$^{3+}$ cations will manifest as a large downshift of the high-frequency silicate band and lower bands with increasing aluminum content [S. L. Lin, C.-S. Hwang, J.-F. Lee, J. Mater. Res., 1996, 11, 2641-2650, incorporated herein by reference in its entirety].

Further, the spectrum for the sample G (502) includes points 'B' and 'C' corresponding to ~916 cm$^{-1}$ and ~660 cm$^{-1}$ regions, respectively. The main high-frequency band is shifted into a lower frequency band compared with to the sample FG6 (512). This effect may be attributed to either a gradual shift in the Si—O stretching frequency or a superpositioning of discrete bands due to a Si(OAL)x unit, where x is the number of aluminate tetrahedra neighboring a silicate tetrahedron [P. McMillan, B. Piriou, A. Navrotsky, Geochim. Cosmochim. Acta, 1982, 46, 2021-2037; and P. McMillan, Am. Mineral., 1984, 69, 622-644, each of which is incorporated herein by reference in its entirety]. Moreover, a band at 665 cm$^{-1}$ can be correlated with "condensed" alumina octahedra or "isolated" alumina tetrahedra in the silicate glasses. The FTIR spectra for the samples G3 (508), G6 (510), show a point 'D' at ~704 cm$^{-1}$, which indicates the presence of AlO$_6$ octahedral unit in a glass structure. However, the presence of the AlO$_6$ octahedral unit also correlated with the silicate-aluminate nanocrystallites, as visible in the XRD.

Introduction of alkali cations (glass former), such as Li$^+$ to SiO$_2$ to glass breaks the Si—O—Si bridging bonds and creates non-bridging oxygens (NBOs). An increase in the alkali cations leads to an increase in the NBOs, which results in de-polymerization of the glass network. In the samples, the influence of doping with the Li-ions is observed as the shift of the point 'B' from 916 cm$^{-1}$ to lower frequencies around 900 cm$^{-1}$ (point 'E') with the increase in the Li-ions content. A point 'F' corresponding to 974 cm$^{-1}$, appeared for the sample G6 doped with the highest amount of the Li-ions. Such change can be attributed to the progressive de-polymerization of a silicate-aluminate network as a consequence of the Li-ions addition. The increase in the Li-ions content increases the content of silicate tetrahedral with three NBO's (Q$^1$). Additionally, the spectra for the samples G3 (508), G6 (510), show a point 'G' corresponding to ~1193 cm$^{-1}$ which can be co-related with Li—H vibrations.

Figure 6A:
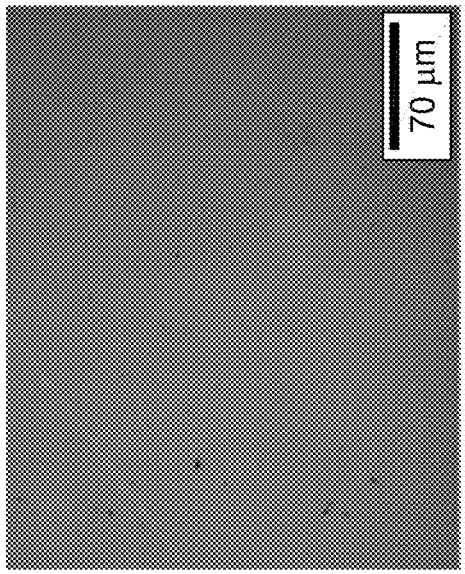
FIG. 6A is an optical microscope image of an undoped calcium-SiAlON (G0), according to certain embodiments of the present disclosure.
Figure 6B:
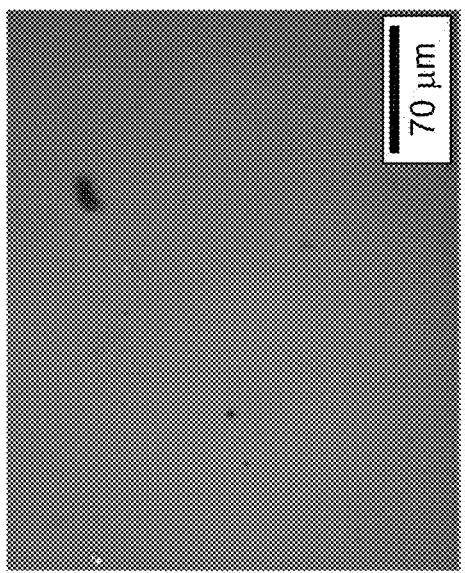
FIG. 6B is an optical microscope image of calcium-SiAlON doped with 1 wt. % of Li-ions (G1), according to certain embodiments of the present disclosure.
Figure 6C:
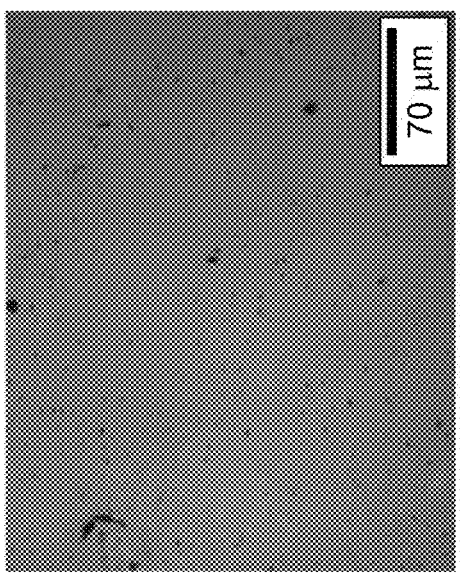
FIG. 6C is an optical microscope image of the calcium-SiAlON doped with 3 wt. % of the Li-ions (G3), according to certain embodiments of the present disclosure.
Figure 6D:
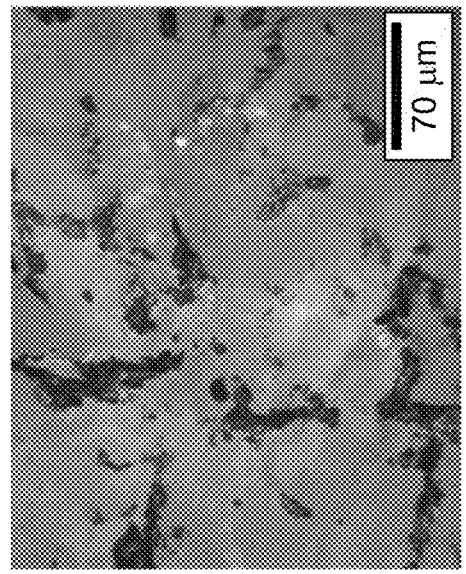
FIG. 6D is an optical microscope image of the calcium-SiAlON doped with 6 wt. % of the Li-ions (G6), according to certain embodiments of the present disclosure.
Figure 6E:
FIG. 6E is an optical microscope image of a soda-lime-silicate glass doped with 6 wt. % of the Li-ions (FG6), according to certain embodiments of the present disclosure.

FIGS. 6A-6E illustrate the optical microscope images of the SPS sintered samples (G0, G1, G3, G6, FG6). FIGS. 6A-6B reveal that the samples G and G0 look amorphous and homogenous after sintering in the SPS, while the FIGS. 6C-6D reveal inhomogeneities in the samples G3, G6, and FG6. A correlation between size and amount of visible inhomogeneities and the Li-ions content in the glass matrix can be observed. For the sample G3 (FIG. 6C) the inhomogeneities appear in the form of randomly distributed single dots, while for the sample G6 (FIG. 6D) the inhomogeneities appeared as bigger separated islands. The biggest inhomogeneities connected to each other were visible for the sample FG6 (FIG. 6E). Such observations were in accordance with the XRD analysis, i.e., the inhomogeneities increase with an increase in the Li-ions content.

Figure 7A:
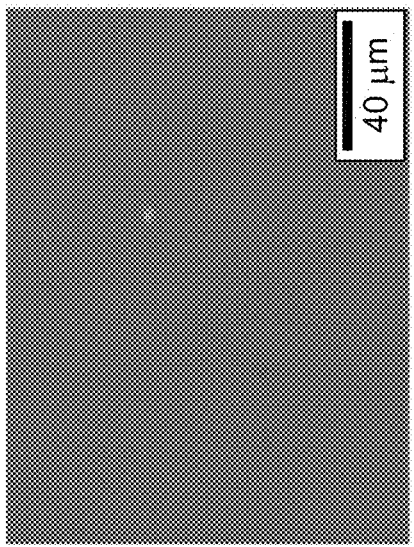
FIG. 7A is a scanning electron microscope (SEM) image of the undoped calcium-SiAlON (G0), according to certain embodiments of the present disclosure.
Figure 7B:
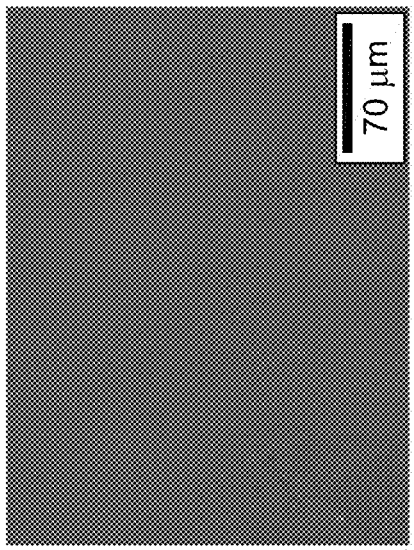
FIG. 7B is the SEM image of the calcium-SiAlON doped with 1 wt. % of the Li-ions (G1), according to certain embodiments of the present disclosure.
Figure 7C:
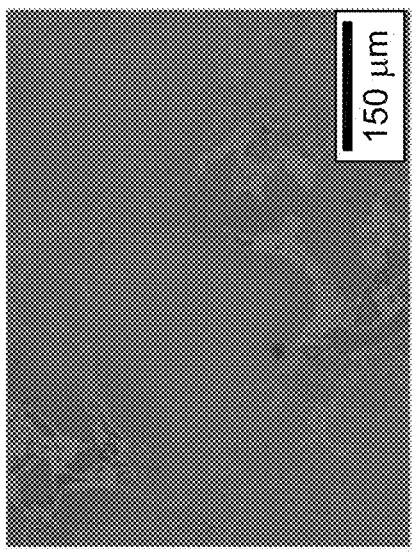
FIG. 7C is the SEM image of the calcium-SiAlON doped with 3 wt. % of the Li-ions (G3), according to certain embodiments.
Figure 7D:
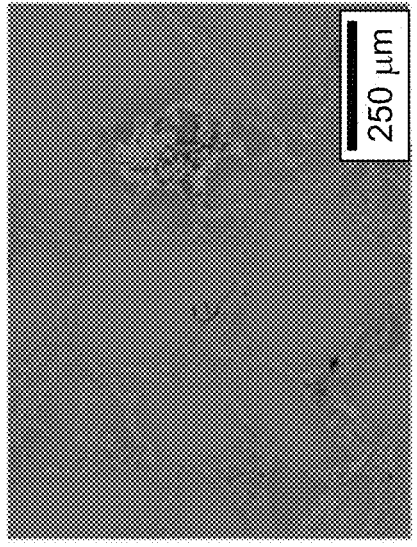
FIG. 7D is the SEM image of the calcium-SiAlON doped with 6 wt. % of the Li-ions (G6), according to certain embodiments.
Figure 7E:
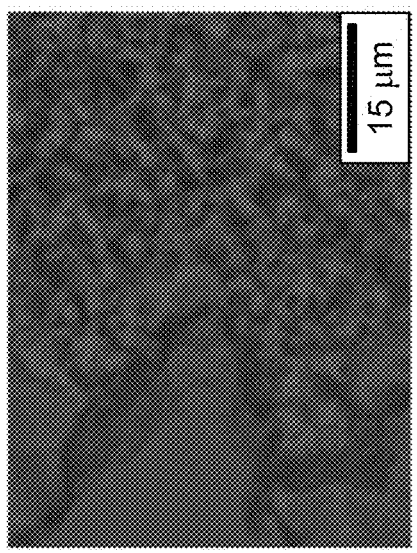
FIG. 7E is the SEM image of a soda-lime-silicate glass doped with 6 wt. % of the Li-ions (FG6), according to certain embodiments.

FIGS. 7A-7E are SEM images showing the microstructure of the SPS sintered samples. SEM investigation revealed that the crystallization is governed by the Li-ions content doped in the glass matrix. The samples G0 and G1 (FIGS. 7A-7B) have homogenous and featureless microstructure without any visible defect or phase separation, typical for material with amorphous nature. FIGS. 7C-7E show that the samples G3, G6, and FG6 have crystalline microstructure.

Physical and Thermal Properties

Density, hardness, reduced elastic modulus, and glass transition temperature of the samples are summarized in Table 2.

TABLE 2

| | | Characteristics of one or more samples | | | | | |
|---|---|---|---|---|---|---|---|
| ID | Li-doped (wt. %) | Sintering Temp °(C.) | Pressure (Mpa) | Density (g/cm$^3$) | T$_g$ (° C.) | Hardness (GPa) | Er (GPa) |
| G | 0 | NA | NA | 2.81 | 940 | 10.5 | 122 |
| G0 | 0 | 900 | 20 | 2.79 | 943 | 10.5 | 124 |
| G1 | 1 | 900 | 20 | 2.78 | 930 | 10.3 | 121 |
| G3 | 3 | 900 | 20 | 2.78 | NA | 10.0 | 119 |
| G6 | 6 | 900 | 20 | 2.77 | NA | 9.5 | 114 |
| FG6 | 6 | 600 | 18 | 2.48 | NA | 6.5 | 68 |

Table 2 shows that the densities of the samples were around 2.80 g/cm$^3$. However, no significant differences in the densities were observed between the pristine glass (G0) and the samples G1, G3, G6, and FG6. The sample FG6 has density values of 2.50 g/cm$^3$, which is lower than the density of pristine float glass (2.54 g/cm$^3$). Hardness values vary between 9.5 and 10.5 GPa and decrease with increasing the Li-ion content in the sample. The pristine glass (G) has a slightly lower value, i.e., 10.2 GPa, than the glass-ceramic sintered without the Li-ions (G0), i.e., 10.5 GPa.

Generally, hardness (H$_v$) values decrease with the increase of the alkali cations, leading to network fragmentation in silicate glass. The decrease of hardness with the addition of Li-ions is attributed to the weaker metal-oxygen bonds incorporated by the Li-ions. A similar trend observed was also observed for the reduced elastic modulus (E$_r$), where a decrease in E$_r$ with addition of the Li-ions from 124 GPa to 115 GPa. This decrease is attributed to de-polymerization of the glass network with the addition of the Li-ions.

Table 2 also shows results of $T_g$/DTA. The pristine glass (G), the SPS sintered glass without Li doped (G0), and the SPS sintered glass doped with 1 wt. % of Li (G1) have a glass transition temperature of 940° C., 943° C. and 930° C., respectively. The thermal properties of pristine glass (G) were not influenced using the SPS. However, doping with the Li-ions decreases the $T_g$, which was attributed to the de-polymerization of a silicate-aluminate network, as confirmed by the FT-IR results. These observations are in good agreement with the microscopy and X-ray analysis that the samples G, G0, and G1 are amorphous in nature as discussed above.

Electrical Properties

Figure 8:
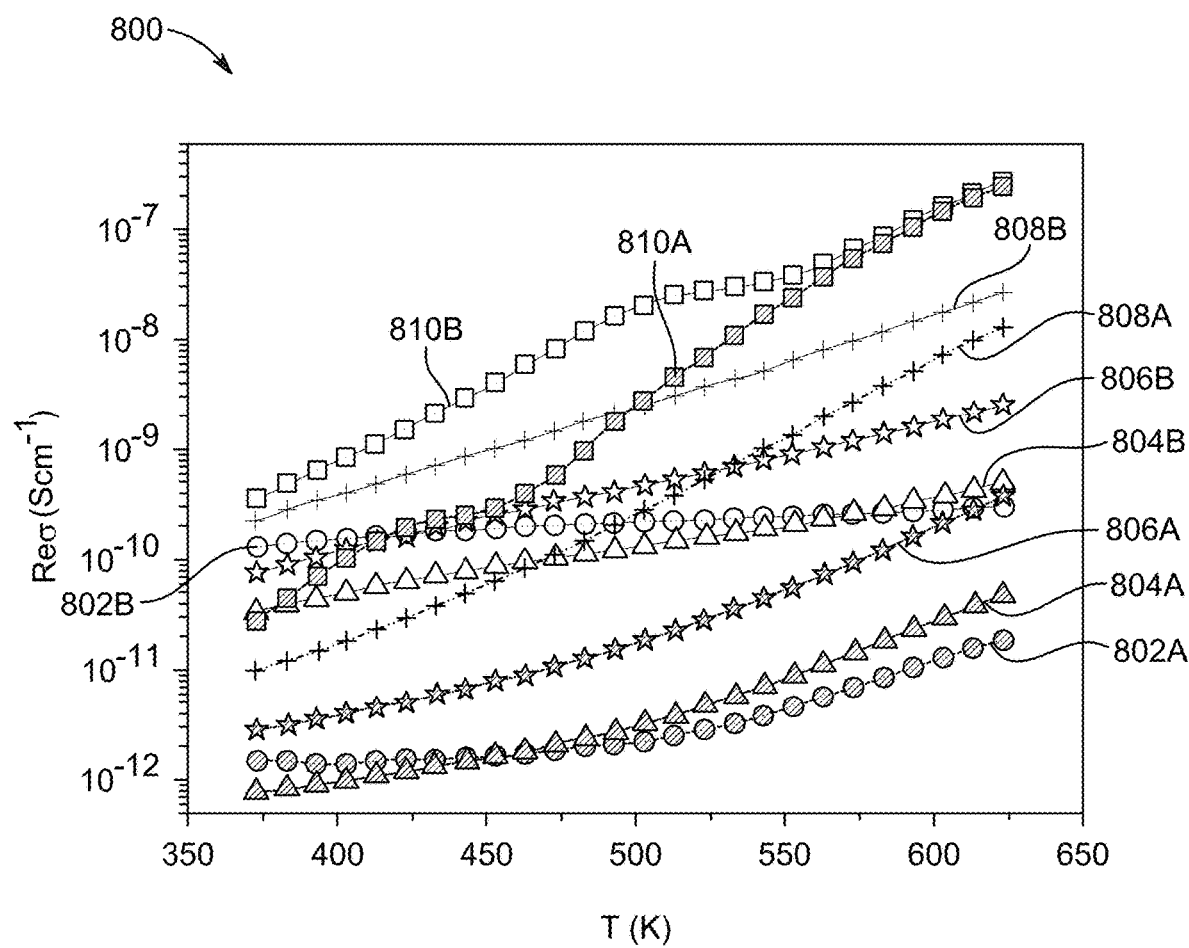
FIG. 8 is a plot illustrating a real part of an alternating current (A.C.) conductivity versus temperature for one or more samples, according to certain embodiments.

FIG. 8 illustrates a graph 800 depicting a real part of the A.C. conductivity versus temperature for the samples. Solid shapes and hollow shapes represent the A.C. conductivity behavior measured at frequency for the samples at 10 Hz and 1000 Hz, respectively. The graph 800 corresponds to the A.C. conductivity behavior measured at the frequency for the samples G0 (802A), G1 (804A), G3 (806A), G6 (808A), and FG6 (810A) at 10 Hz. The graph 800 further corresponds to the A.C. conductivity behavior measured at frequency for the samples G0 (802B), G1 (804B), G3 (806B), G6 (808B), and FG6 (810B) at 1000 Hz. The A.C. conductivity increased with the temperature and frequency for the samples, typical for ionic conductors [N. A. W'ojcik, P. Kupracz, R. J. Barczy'nski, B. Jonson, S. Ali, Solid State Ionics, 2019, 341, 115055, incorporated herein by reference in its entirety]. The lowest values of the A.C. conductivity were exhibited by the samples G0 and G1. The A.C. conductivity increased with the increase in Li-ions content. However, the highest values of A.C. conductivity were observed for the sample FG6.

The highest difference in the A.C. conductivity values were found at high temperatures and low frequency regions. FIGS. 9A-9E illustrate graphs (900A, 900B, 900C, 900D, and 900E) depicting the A.C. conductivity as a function of frequency for exemplar temperatures, particularly 623 K, 573 K, 523K, 473 K, 373 K, for the samples G0, G1, G3, G6, and FG6, respectively.

Figure 9C:
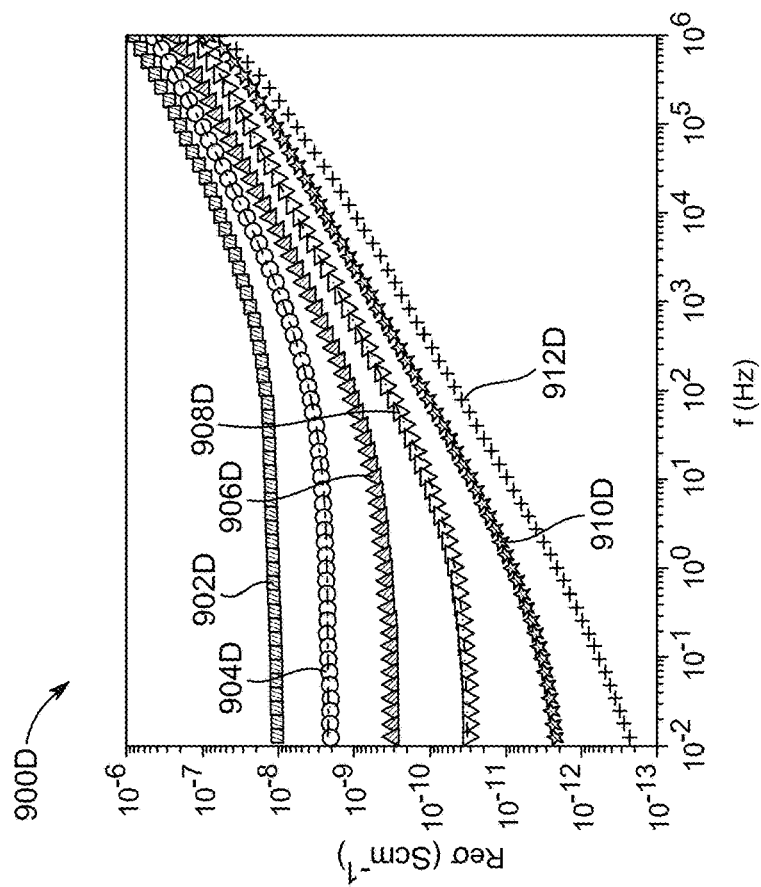
FIG. 9C is a graph depicting the A.C. conductivity as a function of frequency for the calcium-SiAlON doped with 3 wt. % of the Li-ions (G3), according to certain embodiments.
Figure 9D:
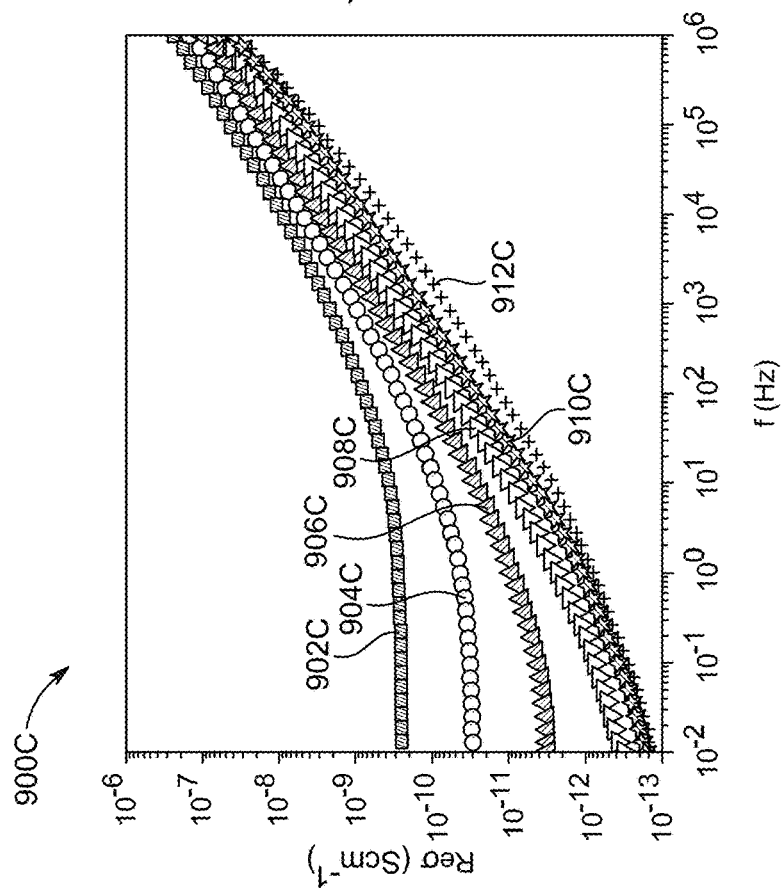
FIG. 9D is a graph depicting the A.C. conductivity as a function of frequency for the calcium-SiAlON doped with 6 wt. % of the Li-ions (G6), according to certain embodiments.

FIG. 9A shows the A.C. conductivity of the sample G0 increases with the frequency in a non-linear fashion. Below the frequency of 100 Hz the temperature effect on the conductivity parameter is visible, while at a higher frequency region, the temperature influence is unclear. Only at temperatures of 613 K and 623 K, the small frequency-independent part called D.C. conductivity is detected. The conductivity behavior completely changed after doping with even a small amount of the Li-ions such as 1 wt. %. The A.C. conductivity spectra of the samples G1, G3, and G6 (FIGS. 9B-9D, respectively) can be divided into a D.C. conductivity ($\sigma_{DC}$) part and an A.C. conductivity ($\sigma_{AC}$) part, which exponentially increased with the frequency. The biggest discrepancy between the conductivity of the undoped glass (G0) and the samples G1, G3, G6 was observed for the A.C. conductivity part. The $\sigma_{AC}$ curves did not overlap for one or more temperatures for the samples containing Li-ions. The temperature spectra separation increased with the increase in the Li-ions content. The frequency and temperature ranges of D.C. plateau also increased. The conductivity behavior of the samples G1, G3 and G6 can be analyzed using the Jonscher relation or equation (1).

$$Re\sigma(\omega) = \sigma_{DC}(T) + A(T)w^{s(T)} \qquad (1)$$

here $Re\sigma(\omega)$ is the frequency dependence of the real part of conductivity, $\sigma_{DC}$ is the frequency-independent D.C. conductivity, A is a co-efficient and s is an exponent which depends on temperature and material properties and $A\omega^s$ describes A.C. dispersion [A. K. Jonscher, Universal dielectric response, Nature, 1997, 267, 673-679, incorporated herein by reference in its entirety].

Figure 9E:
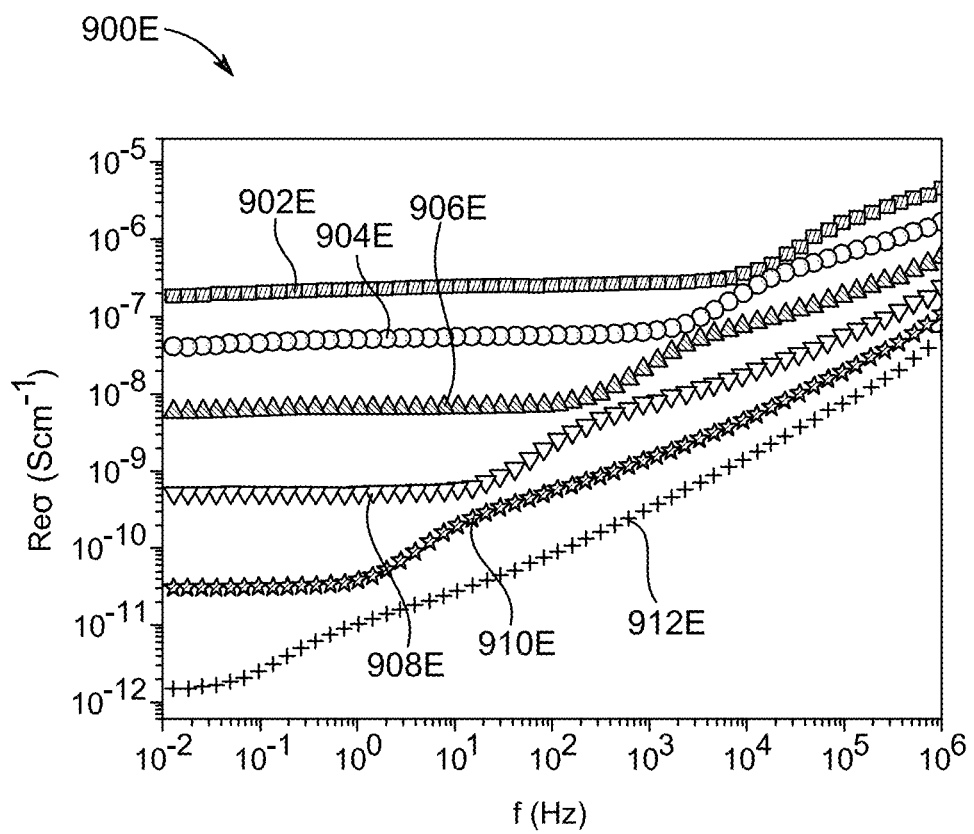
FIG. 9E is a graph depicting the A.C. conductivity as a function of frequency for the soda-lime-silicate glass doped with 6 wt. % of the Li-ions (FG6), according to certain embodiments.

Additionally, in FIG. 9E, the conductivity curves of the sample FG6 also exhibited the D.C. and A.C. conductivity parts. In the A.C. part, additional maxima were observed. The relaxation process, which is thermally activated, may lead to movement of maxima with the temperature towards the higher frequency. However, such behavior is different than for the A.C. part in the sample G0. The D.C. conductivity values were evaluated using the Jonscher relation and for the samples G0 and FG6 by fitting the constant frequency-independent part. Exemplar results of fitting are shown for the sample G6 in FIG. 9D.

Figure 10:
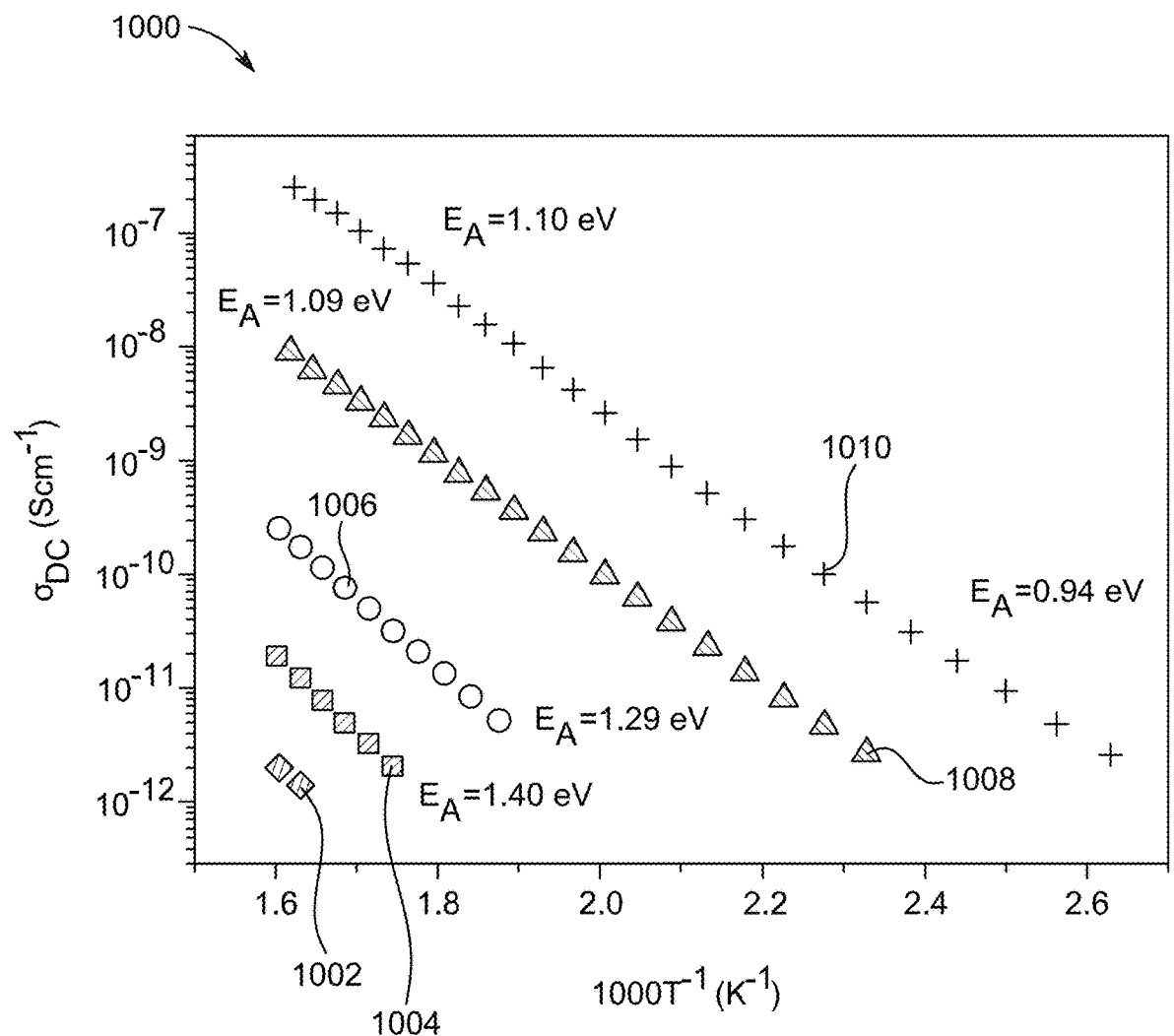
FIG. 10 is a graph depicting a direct current (D.C.) conductivity as a function of reciprocal temperature for one or more samples, according to certain embodiments.
Figure 11A:
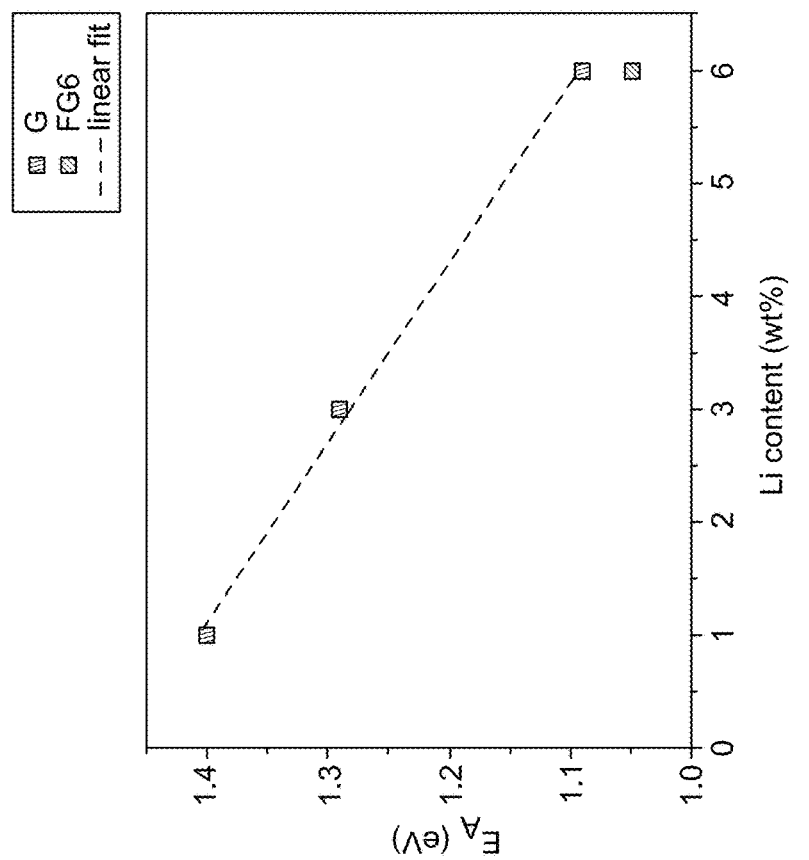
FIG. 11A is a graph depicting the D.C. conductivity as a function of the Li-ions content for one or more samples, according to certain embodiments.

FIG. 10 illustrates a graph 1000 depicting D.C. conductivity against reciprocal temperature for the samples G0 (1002), G1 (1004), G3 (1006), G6 (1008), and FG6 (1010). The lowest values of D.C. conductivity were found for the undoped glass (G0). The D.C. conductivity increased after doping with the Li-ions, and the magnitude of the increase was correlated with the Li-ions content as shown in FIG. 11A (1100A). Increase of 4 orders of magnitude was seen between the undoped glass G0, and the sample G6. However, the comparative sample FG6 doped also with 6 wt. % of Li exhibits even higher values of the D.C. conductivity, of more than one order of magnitude higher than sample G6. The temperature dependences of the D.C. conductivity found for the samples G0, G1, G3, G6, and FG6 follow the Arrhenius law, provided by equation (2).

$$\sigma_{DC}T = \sigma_0 \exp\left(-\frac{E_A}{kT}\right) \qquad (2)$$

where $\sigma_0$ is the conductivity pre-exponential factor, $E_A$ is the activation energy for the long-range diffusion of mobile ions, and k is the Boltzman's constant. The values of $E_A$ estimated from the fitting of FIG. 10 with equation (2) are listed in FIG. 10 for the samples doped with Li.

Figure 11B:
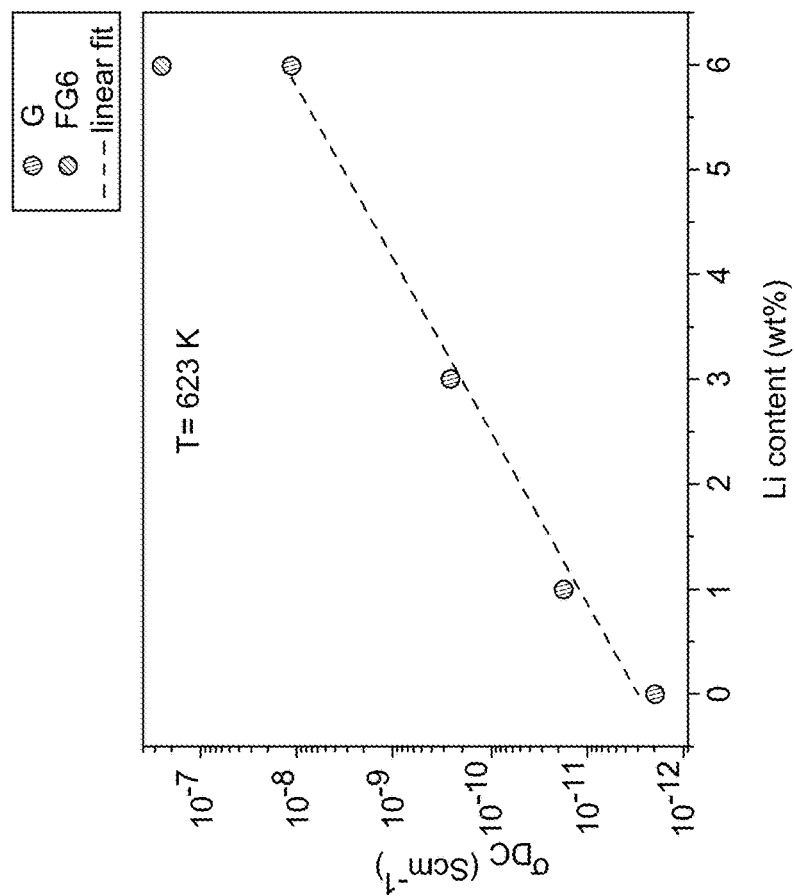
FIG. 11B is a graph depicting an activation energy as a function of the Li-ions content for one or more samples, according to certain embodiments.

Additionally, an activation energy is displayed as a function of the Li-ions content as shown in FIG. 11B. The activation energy value is the highest for the sample G1 and the activation energy value decreases with the increase in Li concentration. The magnitude of activation energy observed for the samples doped with the Li-ions (more than 1 eV) is typical for an ion hopping mechanism. In the samples doped with the Li-ions, the D.C. conduction mechanism is dominated by $Li^+$ hopping. However, the LiOH is used as a dopant allows for a second type of charge carrier: proton ions. Moreover, the undoped glass G0 does not contain lithium and proton ions. The undoped glass G0 also exhibits D.C. conductivity at the temperatures of 613 K and 623 K. The undoped glass G0 exhibits a typical ionic conductivity with oxygen ions as charge carriers [J. Karczewski, T. Miruszewski, B. Bochentyn, B. Kusz, Mater Sci-Poland, 2017, 35, incorporated herein by reference in its entirety]. The conduction mechanism may also be observed in the samples doped with Li-ions. Therefore, the samples D.C. conductivity and activation energy values are a sum of the different charge carrier contributions. However, clear correlation with the Li-ions quantity unequivocally demonstrates the domination of the $Li^+$ hopping mechanism (FIG. 11A-11B). The comparative example sample FG6 is more complicated as it includes ~13 wt. % of Na. Ions such as $Li^+$, $Na^+$, $H^+$, and $O^{2+}$ hopping can all contribute to the conduction mechanism in the float glass sample. Moreover, in the float glass, the activation energy can be divided into low and high temperature regions. The highest values of D.C. conductivity and lower activation energy for low temperature range in the sample FG6 can be correlated with significantly higher content of all alkali than in G6.

Figure 12:
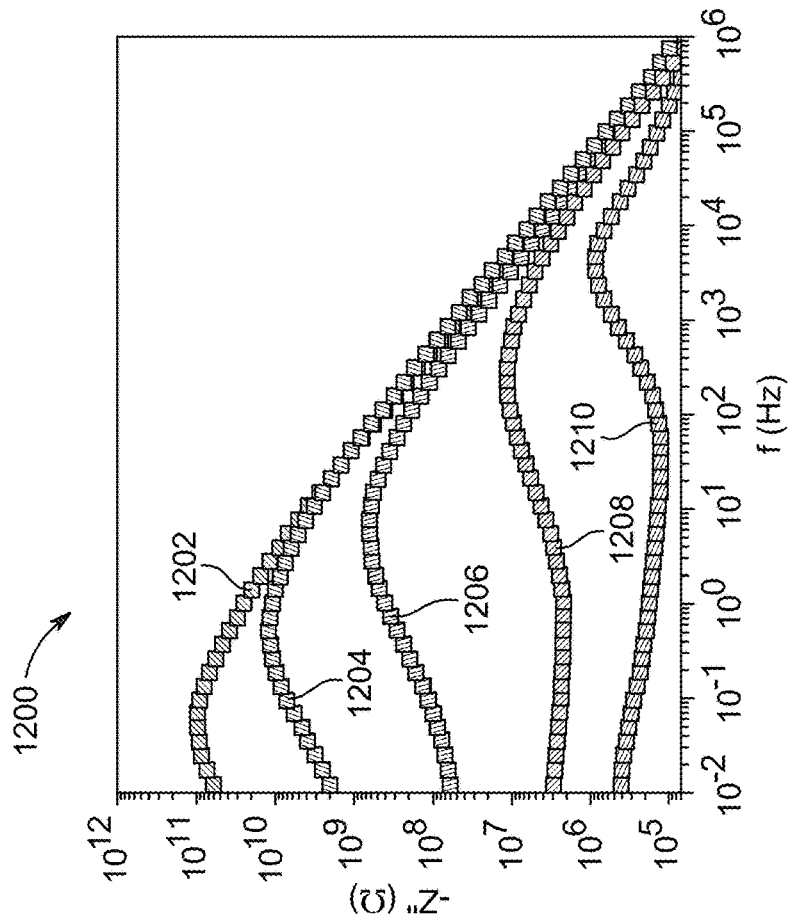
FIG. 12 is a graph depicting an imaginary part of an impedance as a function of frequency for one or more samples, according to certain embodiments.

FIG. 12 illustrates a graph 1200 depicting an imaginary part of the impedance as a function of frequency in log-log scale for the samples G0 (1202), G1 (1204), G3 (1206), G6 (1208), and FG6 (1210) measured at a temperature of 613 K. A maximum is visible for all samples. The frequency position of the maximum moves into the higher frequency region with the increase in the Li-ions content for the samples G0, G1, G3, G6, and FG6. However, the shape of the maximum is not symmetrical and is indicative of more than one relaxation process. Moreover, in the samples G3, G6, and FG6, a further increase in the imaginary part of impedance with the decrease in the frequency was found. This process can be correlated with the polarization effect due to charge carriers accumulation on electrodes. Moreover, transition in the A.C. part can be observed, especially in the sample FG6 with the asymmetric shape of maximum.

Figure 13:
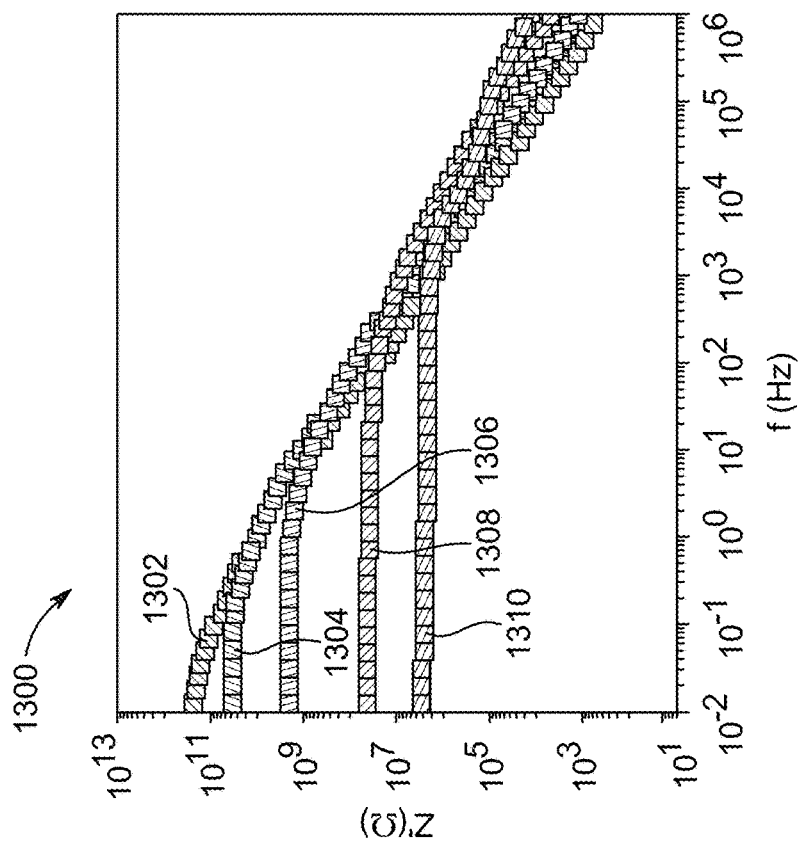
FIG. 13 is a graph depicting a real part of the impedance as a function of frequency for one or more samples, according to certain embodiments.

FIG. 13 is a graph 1300 depicting the real part of the impedance as a function of frequency in log-log scale for the samples G0 (1302), G1 (1304), G3 (1306), G6 (1308), and FG6 (1310) measured at a temperature of 613 K. In the graph 1300, the D.C. part can be observed for the samples G0, G1, G3, G6, and FG6.

Figure 14:
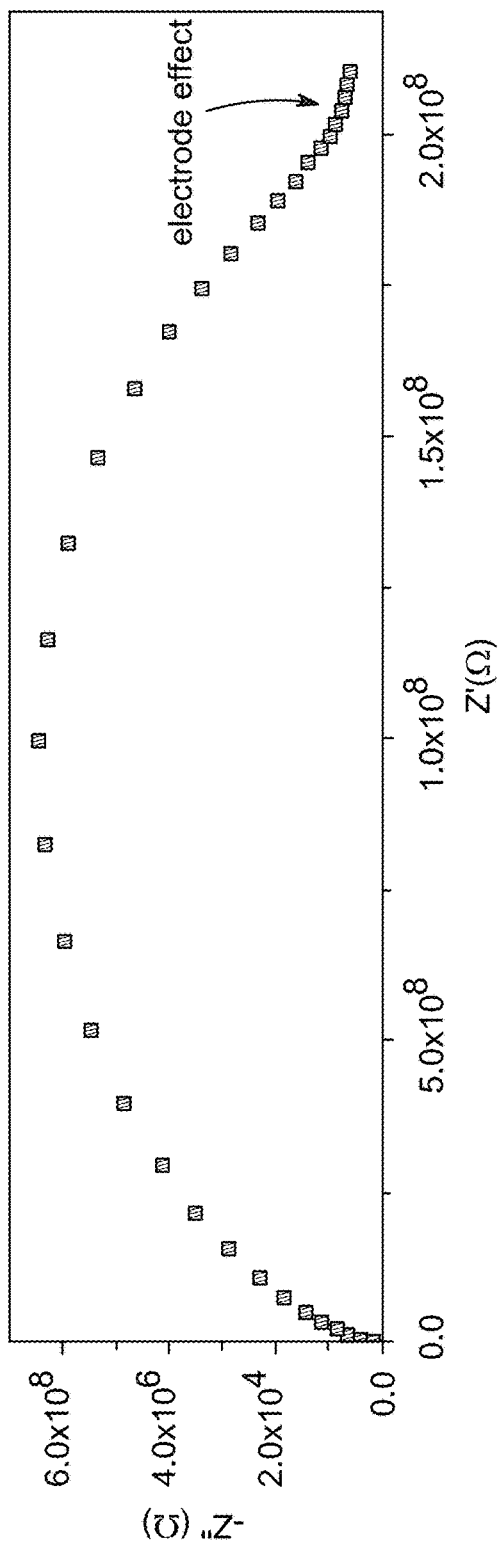
FIG. 14 is a Nyquist plot for the calcium-SiAlON doped with 3 wt. % of the Li-ions (G3), according to certain embodiments.
Figure 15:
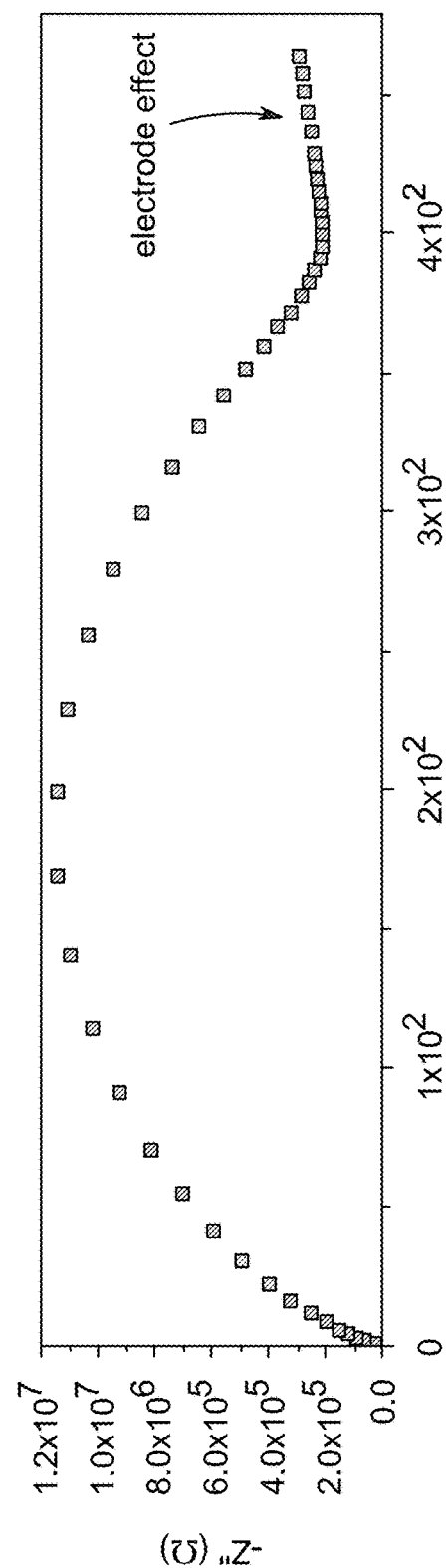
FIG. 15 is a Nyquist plot for the calcium-SiAlON doped with 6 wt. % of the Li-ions (G6), according to certain embodiments.
Figure 16:
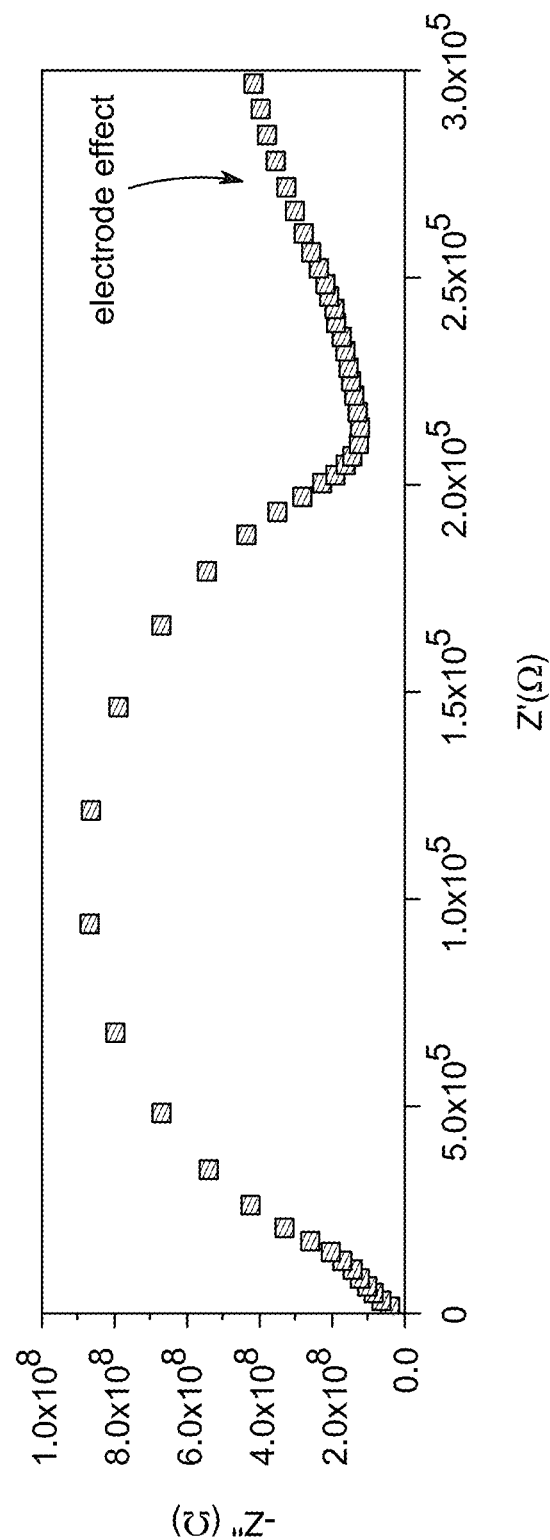
FIG. 16 a Nyquist plot for the soda-lime-silicate glass doped with 6 wt. % of the Li-ions (FG6), according to certain embodiments.

FIGS. 14-16 are Nyquist plots (the imaginary versus the real part of the impedance) for the samples G3, G6, and FG6. At least two semicircles and the beginning of the third one can be noticed in each of FIGS. 14-16. The semicircles can be correlated with the two or more relaxation processes, which occurred in the samples G3, G6, and FG6. The observation is in accordance with the conduction mechanism in the samples G3, G6, and FG6, which can be attributed to more than one kind of ion hopping. However, in the case of the glass-ceramic materials, more than one relaxation process can also be explained by the presence of crystallites and grain boundaries/interface. The visible beginning of the third process can be assigned to the electrode and/or grain boundary effect [N. A. Szreder, P. Kupracz, M. Prze'sniak-Welenc, J. Karczewski, M. Gazda, R. J. Barczy'nski, Solid State Ionics, 2015, 271, 86-90; and N. A. W'ojcik, P. Kupracz, R. J. Barczy'nski, Solid State Ionics, 2018, 317, 7-14, each of which is incorporated herein by reference in its entirety].

Figure 17:
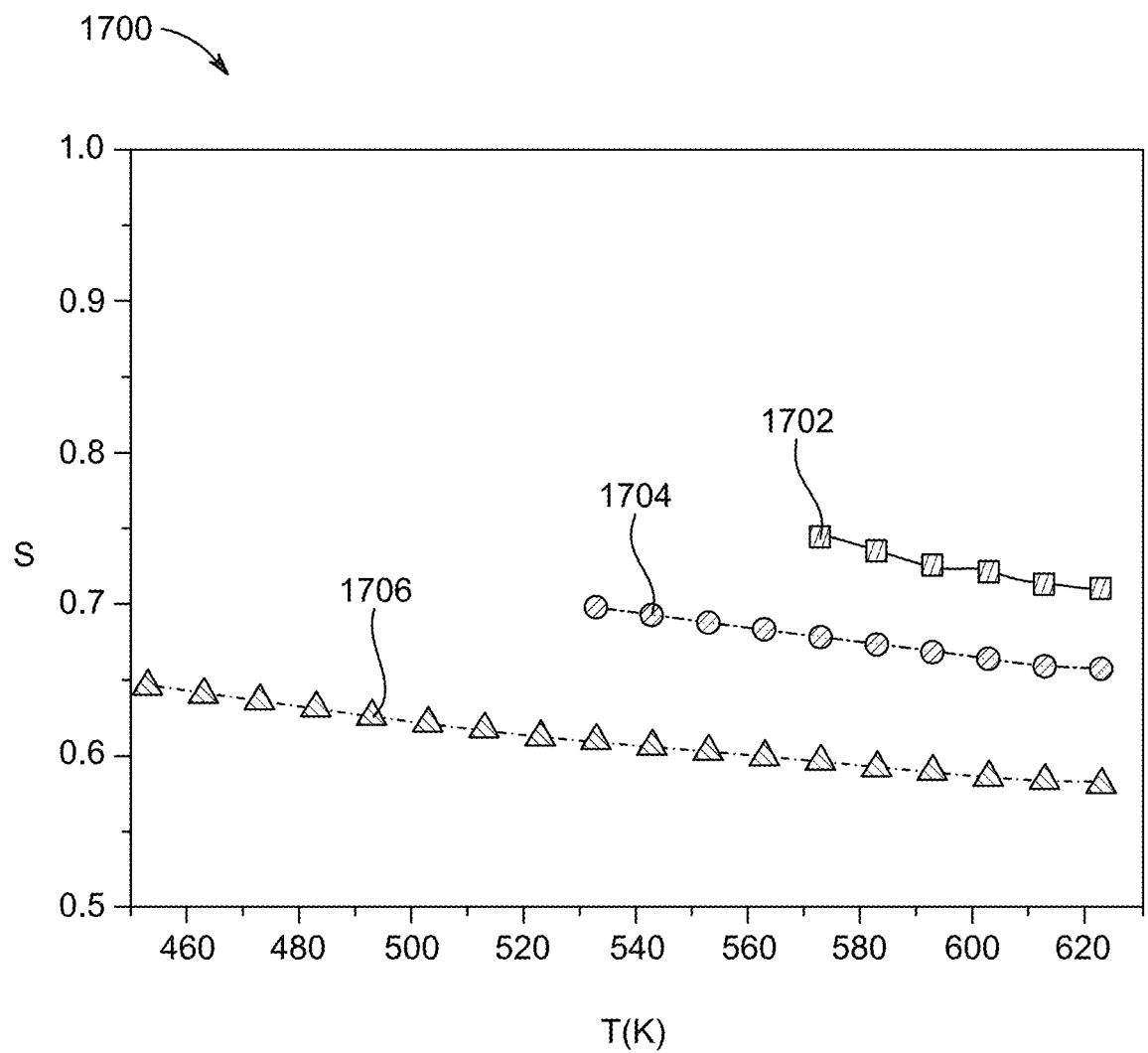
FIG. 17 is a graph depicting exponent values as a function of temperature for one or more samples, according to certain embodiments.

Equation (1) allowed for the estimation of exponent s for the samples G1, G3, and G6, which did not show additional relaxation in the A.C. conductivity region. FIG. 17 is a graph 1700 depicting exponent values (s) for the samples G1 (1702), G3 (1704), and G6 (1706), as a function of temperature. The exponent value (s) can be useful in the prediction of conduction mechanism in glasses and glass-ceramics. The value of s ranging between 0 and 1 indicates a translational motion with a sudden hopping [K. Funke, Prog. Solid State Chem., 1993, 22, 111-195, incorporated herein by reference in its entirety]. However, in ion-conductors, the parameter (s) can be found between 0.5 and 1 and can be correlated to an ideal long-range pathways and diffusion limited hopping. For the samples G1, G3 and G6, the parameter (s) lies between 0.6 and 0.8 and slightly decreases with temperature. The lowest values of parameter (s) for the sample G1 can be attributed to a low rate of successful jumps, which results in low D.C. conductivity values as compared to the samples G3, G6 [S. R. Elliott, A. P. Owens, Philos. Mag. B, 1989, 60, 777-792, incorporated herein by reference in its entirety]. The exponent value (s) decrease with the increase in the Li-ions content for the samples G3 and G6. Additionally, the temperature range in which the exponent value (s) could be correctly fitted also increases. Increasing the content of mobile ions, the interaction between the mobile ions and lattice around the mobile ions also increases, which leads to the reduction in the exponent value (s). Therefore, such changes can be correlated with the increase in the rate of successful jumps of ions, resulting in the increased value of D.C. conductivity.

The invention claimed is:

1. A method of forming an alkali metal-doped calcium-SiAlON material, the method comprising:
   forming a calcium-SiAlON ceramic by calcining a precursor mixture comprising calcium hydride, aluminum oxide, silicon nitride, and silica, then milling to form a calcium-SiAlON powder;
   mixing the calcium-SiAlON powder and an alkali metal hydroxide to form a reaction mixture; and
   spark plasma sintering (SPS) the reaction mixture at 800 to 940 degrees Celsius (° C.) to form the alkali metal-doped calcium-SiAlON material,
   wherein the alkali metal hydroxide is present in an amount of 0.1 to 10 weight percentage (wt. %), based on a total weight of the reaction mixture.

2. The method of claim 1, wherein the calcium-SiAlON powder has a formula of $Ca_{11}Al_{14}Si_{16}O_{49}N_{10}$.

3. The method of claim 1, further comprising preparing the calcium-SiAlON powder by:
   mixing calcium hydride, aluminum oxide, silicon nitride, and silica to form the precursor mixture;
   calcining the precursor mixture at 1400 to 1800° C. under a nitrogen-containing atmosphere to form a calcium-SiAlON solid; and
   milling the calcium-SiAlON solid to form the calcium-SiAlON powder.

4. The method of claim 1, wherein the calcium-SiAlON powder is amorphous by Powder X-ray Diffraction (PXRD).

5. The method of claim 1, wherein the spark plasma sintering (SPS) is performed at a pressure of 10 to 30 megapascals (MPa).

6. The method of claim 1, wherein the spark plasma sintering (SPS) is performed under a vacuum or an inert atmosphere.

7. The method of claim 1, wherein the alkali metal hydroxide is present in an amount of 1 to 6 wt. %, based on a total weight of the reaction mixture.

8. The method of claim 1, wherein the alkali metal-doped calcium-SiAlON material comprises 0.1 to 10 wt. % alkali metal based on a total weight of the alkali metal-doped calcium-SiAlON material.

9. The method of claim 1, wherein the alkali metal hydroxide is lithium hydroxide and the alkali metal-doped calcium-SiAlON material is a lithium-doped calcium-SiAlON material.

10. The method of claim 9, wherein the lithium-doped calcium-SiAlON material comprises crystalline $Li(AlSi_2O_6)$ by PXRD.

11. The method of claim 1, wherein the alkali metal-doped calcium-SiAlON material has a density of 2.7 to less than 2.81 gram per cubic centimeter ($g/cm^3$).

12. The method of claim 1, wherein the alkali metal-doped calcium-SiAlON material has an elastic modulus ($E_r$) of 110 to less than 124 gigapascals (GPa).

13. The method of claim 1, wherein the alkali metal-doped calcium-SiAlON material has a direct current (D.C.)

conductivity ($\sigma_{DC}$) of greater than $10^{-11}$ to $10^{-6}$ siemens per centimeter (S·cm$^{-1}$) at a temperature of 623 kelvin (K.).

14. The method of claim 1, wherein the alkali metal-doped calcium-SiAlON material has a real part of an alternating current (A.C.) conductivity (Re$\sigma_{AC}$) of greater than $10^{-11}$ to $10^{-6}$ S·cm$^{-1}$ at a temperature of 623 K, a real impedance (Z') of $10^5$ to less than $10^{11}\Omega$ at $10^{-2}$ to $10^{-1}$ hertz (Hz) at a temperature of 613 K, an imaginary part of impedance (Z") of $10^5$ to less than $10^{11}\Omega$ at $10^{-2}$ to $10^{-1}$ Hz at a temperature of 613 K, and a maximum imaginary impedance (Z") which occurs at a frequency of greater than $10^{-1}$ to $10^5$ Hz at a temperature of 613 K.

\* \* \* \* \*